US012395680B2

(12) United States Patent
He et al.

(10) Patent No.: US 12,395,680 B2
(45) Date of Patent: Aug. 19, 2025

(54) SYSTEMS AND METHODS FOR VERSATILE VIDEO CODING

(71) Applicant: VID SCALE, INC., Wilmington, DE (US)

(72) Inventors: Yong He, San Diego, CA (US); Yuwen He, San Diego, CA (US)

(73) Assignee: InterDigital Madison Patent Holdings, SAS, Paris (FR)

(*) Notice: Subject to any disclaimer, the term of this patent is extended or adjusted under 35 U.S.C. 154(b) by 580 days.

(21) Appl. No.: 17/761,754

(22) PCT Filed: Sep. 18, 2020

(86) PCT No.: PCT/US2020/051422
§ 371 (c)(1),
(2) Date: Mar. 18, 2022

(87) PCT Pub. No.: WO2021/055699
PCT Pub. Date: Mar. 25, 2021

(65) Prior Publication Data
US 2022/0377344 A1 Nov. 24, 2022

Related U.S. Application Data

(60) Provisional application No. 62/911,797, filed on Oct. 7, 2019, provisional application No. 62/902,647, filed on Sep. 19, 2019.

(51) Int. Cl.
*H04N 19/70* (2014.01)
*H04N 19/136* (2014.01)
(Continued)

(52) U.S. Cl.
CPC .......... *H04N 19/70* (2014.11); *H04N 19/136* (2014.11); *H04N 19/169* (2014.11); *H04N 19/174* (2014.11); *H04N 23/698* (2023.01)

(58) Field of Classification Search
CPC .... H04N 19/169; H04N 19/17; H04N 19/174; H04N 19/70
See application file for complete search history.

(56) References Cited

U.S. PATENT DOCUMENTS

| 11,375,238 B2 * | 6/2022 | Choi | H04N 19/513 |
| 11,930,217 B2 * | 3/2024 | Choi | H04N 19/597 |

(Continued)

FOREIGN PATENT DOCUMENTS

| CA | 3150261 A1 * | 3/2021 | H04N 19/105 |
| EP | 3422724 A1 | 1/2019 | |

(Continued)

OTHER PUBLICATIONS

Bross et al., "Versatile Video Coding (Draft 6)", JVET-O2001-VD, Editors, Joint Video Experts Team (JVET) of ITU-T SG 16 WP 3 and ISO/IEC JTC 1/SC 29/WG 11, 15th Meeting: Gothenburg, SE, Jul. 3-12, 2019, 456 pages.

(Continued)

*Primary Examiner* — David N Werner
(74) *Attorney, Agent, or Firm* — Condo Roccia Koptiw LLP

(57) ABSTRACT

Described herein are systems, methods, and instrumentalities associated with video coding. The signaling of certain syntax elements may be moved from a slice header to a picture header and/or a layer access unit delimiter (AUD). The dependency between AUD and one or more parameter sets may be explored. Syntax elements may be signaled to enable wrap-around motion compensation for certain sub-picture(s) and specify wrap-around motion compensation offsets for the sub-picture(s).

20 Claims, 15 Drawing Sheets

(51) Int. Cl.
  *H04N 19/169*  (2014.01)
  *H04N 19/174*  (2014.01)
  *H04N 23/698*  (2023.01)

(56) References Cited

U.S. PATENT DOCUMENTS

| 2017/0085917 | A1 |   | 3/2017  | Hannuksela |           |
|--------------|----|---|---------|------------|-----------|
| 2021/0092447 | A1 | * | 3/2021  | Choi       | H04N 19/46 |
| 2021/0306648 | A1 | * | 9/2021  | Chen       | H04N 19/44 |
| 2021/0314623 | A1 | * | 10/2021 | Chang      | H04N 19/136 |
| 2021/0329236 | A1 | * | 10/2021 | Hendry     | H04N 19/184 |
| 2021/0409703 | A1 | * | 12/2021 | Wang       | H04N 19/184 |
| 2022/0007053 | A1 | * | 1/2022  | Hanhart    | H04N 19/46 |
| 2022/0094909 | A1 | * | 3/2022  | Hannuksela | H04N 19/167 |
| 2022/0116642 | A1 | * | 4/2022  | Choi       | H04N 19/597 |
| 2022/0159246 | A1 | * | 5/2022  | Zhang      | H04N 19/30 |
| 2023/0012751 | A1 | * | 1/2023  | Hendry     | H04N 19/174 |
| 2024/0244264 | A1 | * | 7/2024  | Choi       | H04N 19/597 |

FOREIGN PATENT DOCUMENTS

| WO | WO-2020008106 | A1 | * | 1/2020 | ............ | H04N 19/17 |
| WO | WO-2020141258 | A1 | * | 7/2020 | ............ | H04N 19/119 |
| WO | WO-2020141260 | A1 | * | 7/2020 | ............ | G06T 9/001 |
| WO | WO-2020185884 | A1 | * | 9/2020 | ............ | G06V 10/62 |

OTHER PUBLICATIONS

Chen et al., "Algorithm Description for Versatile Video Coding and Test Model 6 (VTM 6)", JVET-O2002-V2, Editors, Joint Video Experts Team (JVET) of ITU-T SG 16 WP 3 and ISO/IEC JTC 1/SC 29/WG 11, 15th Meeting: Gothenburg, SE, Jul. 3-12, 2019, 87 pages.

Choi et al., "AHG12: On Padding Processing with Subpictures", JVET-P0220, Tencent, Joint Video Experts Team (JVET) of ITU-T SG 16 WP 3 and ISO/IEC JTC 1/SC 29/WG 11, 16th Meeting: Geneva, CH, Oct. 1-11, 2019, pp. 1-3.

He et al., "On Subpicture Wraparound Motion Compensation", JVET-P0127, InterDigital Communications, Inc., Joint Video Experts Team (JVET) of ITU-T SG 16 WP 3 and ISO/IEC JTC 1/SC 29/WG 11, 16th Meeting: Geneva, CH, Oct. 1-11, 2019, pp. 1-4.

ISO/IEC, "Requirements for a Future Video Coding Standard v5", Requirements, ISO/IEC JTC1/SC29/WG11 N17074, Torino, IT, Jul. 2017, pp. 2-14.

Zhou, Minhua, "AHG8: Unrestricted Motion Compensation for 360 Video in ERP Format", JVET-E0065, Broadcom Limited, Joint Video Exploration Team (JVET) of ITU-T SG 16 WP 3 and ISO/IEC JTC 1/SC 29/WG 11, 5th Meeting: Geneva, CH, Jan. 12-20, 2017, pp. 1-3.

Deshpande, Sachin et al., "On Tile Grouping", JVET of ITU-T SG 16 WP 3 and ISO/IEC JTC 1/SC 29/WG 11; 13th Meeting: Marrakech, MA; JVET-M0853-v2, Jan. 9-18, 2019, 8 pages.

Boyce et al., "Sub-Pictures And Sub-Picture Sets With Level Derivation", JVET-O0555-v1, Joint Video Experts Team (JVET) of ITU-T SG 16 WP 3 and ISO/IEC JTC 1/SC 29/WG 11, 15th Meeting: Gothenburg, SE, Jul. 3-12, 2019, 11 pages.

* cited by examiner

FIG. 10

SYSTEMS AND METHODS FOR VERSATILE VIDEO CODING

CROSS-REFERENCE TO RELATED APPLICATIONS

This application is the National Stage Entry under 35 U.S.C. § 371 of Patent Cooperation Treaty Application No. PCT/US2020/051422, filed Sep. 18, 2020, which claims the benefit of Provisional U.S. Patent Application No. 62/902,647, filed Sep. 19, 2019 and Provisional U.S. Patent Application No. 62/911,797, filed Oct. 7, 2019, the disclosures of which are incorporated herein by reference in their entireties.

BACKGROUND

Video coding standards have been in constant development to improve coding efficiency (e.g., compression efficiency), to support various video formats such as standard dynamic range videos, high dynamic range videos, omnidirectional videos and projections, and/or the like.

SUMMARY

Described herein are systems, methods, and instrumentalities associated with versatile video coding. A video decoding apparatus as described herein may comprise one or more processors configured to obtain video data, determine whether to apply wrap-around motion compensation to a first sub-picture of a coded picture based on the video data, and, responsive to a determination that wrap-around motion compensation is to be applied to the first sub-picture, perform the wrap-around motion compensation for the first sub-picture. The video data may include information about the first sub-picture including, e.g., an indication of whether wrap-around motion compensation is enabled for the first sub-picture. The coded picture may further comprise a second sub-picture and the video data may include information about the second sub-picture including, e.g., an indication of whether wrap-around motion compensation is enabled for the second sub-picture. For example, the video data may include information that indicates that wrap-around motion compensation is enabled for the first sub-picture and disabled for the second sub-picture. The video data may also include information that specifies (e.g., when wrap-around motion compensation is enabled for the first sub-picture or the second sub-picture) respective wrap-around offsets associated with the first sub-picture and the second sub-picture, and the one or more processors of the video decoding apparatus may be configured to perform the wrap-around compensation based on the wrap-around offset associated with the first sub-picture or the second sub-picture.

In examples, the information in the video data may include a picture parameter set (PPS) syntax element that indicates that wrap-around motion compensation is enabled and a sequence parameter set (SPS) syntax element that indicates that the first sub-picture (or the second sub-picture) is to be treated as a picture. In examples, performing the wrap-around motion compensation for the first sub-picture may comprise performing luma sample bilinear interpolation for the first sub-picture based on the wrap-around offset associated with the first sub-picture. In examples, the wrap-around motion compensation described herein may be performed in a horizontal direction, and the coded picture that includes the first sub-picture and the second sub-picture may be associated with a 360-degree video.

A video encoding apparatus as described herein may comprise one or more processors that may be configured to code a picture, obtain information that indicates whether wrap-around motion compensation is enabled for a first sub-picture of the coded picture and a wrap-around offset associated with the first sub-picture, and form a set of coded data that includes the coded picture and the obtained information. In examples, the coded picture may further comprise a second sub-picture and the obtained information may further indicate that wrap-around motion compensation is enabled for the first sub-picture and disabled for the second sub-picture. In examples, the obtained information may comprise a picture parameter set (PPS) syntax element that indicates that wrap-around motion compensation is enabled and a sequence parameter set (SPS) syntax element that indicates that the first sub-picture is to be treated as a picture. In examples, the one or more processors of the video encoding apparatus may be further configured to transmit the set of coded data to a receiving device.

BRIEF DESCRIPTION OF THE DRAWINGS

FIG. 10 are diagrams illustrating examples of sub-picture grids.

DETAILED DESCRIPTION

A detailed description of illustrative embodiments will now be described with reference to the various Figures. Although this description provides a detailed example of possible implementations, it should be noted that the details are intended to be exemplary and in no way limit the scope of the application.

This application describes a variety of aspects, including tools, features, examples, models, approaches, etc. Many of these aspects are described with specificity and, at least to show the individual characteristics, are often described in a manner that may sound limiting. However, this is for purposes of clarity in description, and does not limit the application or scope of those aspects. Indeed, all of the different aspects can be combined and interchanged to provide further aspects. Moreover, the aspects can be combined and interchanged with aspects described in earlier filings as well.

The aspects described and contemplated in this application can be implemented in many different forms. FIGS. 1-12D described herein may provide some examples, but other examples are contemplated and the discussion of FIGS. 1-12D does not limit the breadth of the implementations. At least one of the aspects generally relates to video encoding and decoding, and at least one other aspect generally relates to transmitting a bitstream generated or encoded. These and other aspects can be implemented as a method, an apparatus, a computer readable storage medium having stored thereon instructions for encoding or decoding video data according to any of the methods described, and/or a computer readable storage medium having stored thereon a bitstream generated according to any of the methods described.

In the present application, the terms "reconstructed" and "decoded" may be used interchangeably, the terms "pixel" and "sample" may be used interchangeably, the terms "image," "picture" and "frame" may be used interchangeably. Usually, but not necessarily, the term "reconstructed" is used at the encoder side while "decoded" is used at the decoder side.

Various methods are described herein, and each of the methods comprises one or more steps or actions for achieving the described method. Unless a specific order of steps or actions is required for proper operation of the method, the order and/or use of specific steps and/or actions may be modified or combined. Additionally, terms such as "first", "second", etc. may be used in various examples to modify an element, component, step, operation, etc., such as, for example, a "first decoding" and a "second decoding". Use of such terms does not imply an ordering to the modified operations unless specifically required. So, in this example, the first decoding need not be performed before the second decoding, and may occur, for example, before, during, or in an overlapping time period with the second decoding.

Figure 1:
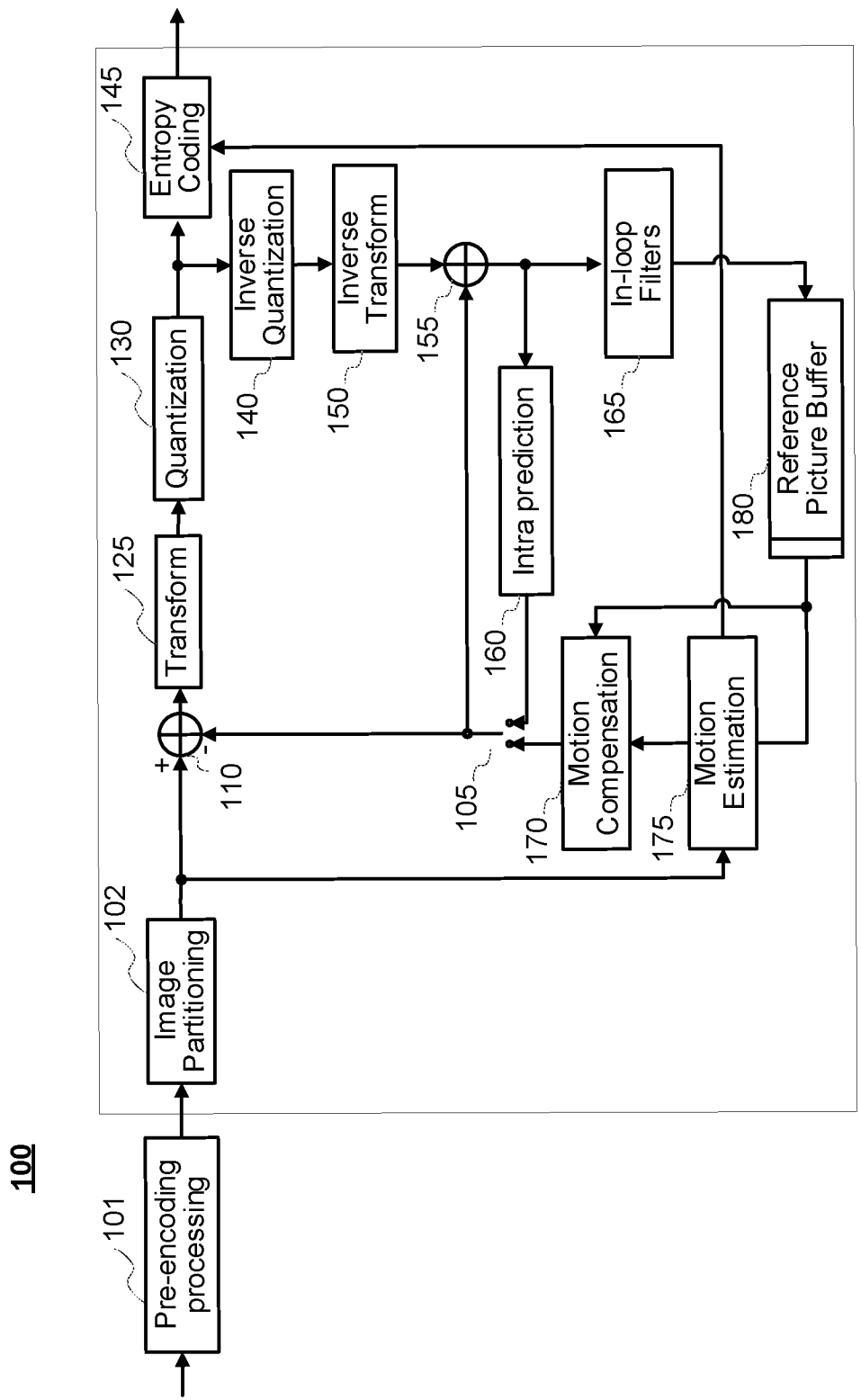
FIG. 1 illustrates an example video encoder.
Figure 2:
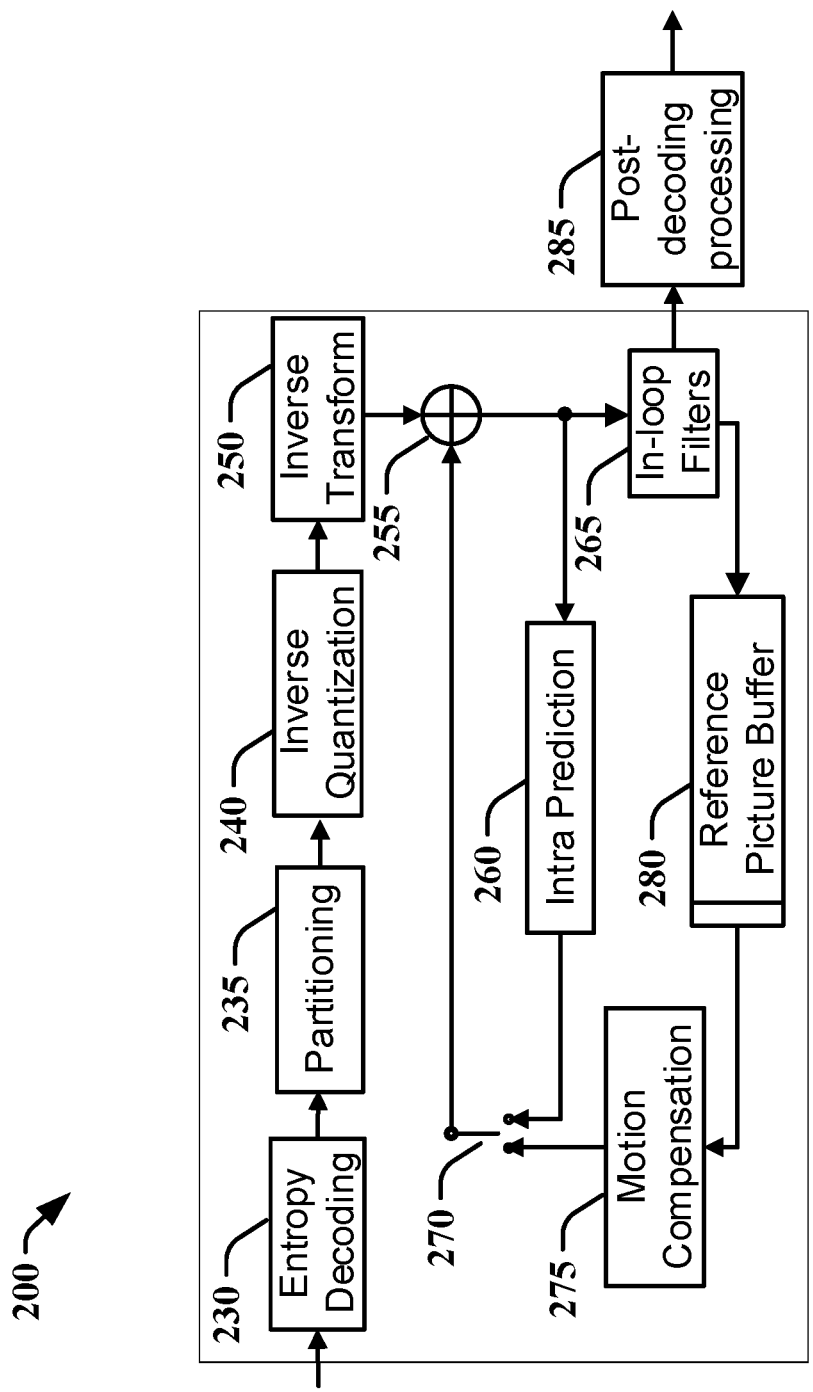
FIG. 2 illustrates an example video decoder.

Various methods and other aspects described in this application can be used to modify modules, for example, decoding modules, of a video encoder 100 and decoder 200 as shown in FIG. 1 and FIG. 2. Moreover, the present aspects are not limited to VVC or HEVC, and can be applied, for example, to other standards and recommendations, whether pre-existing or future-developed, and extensions of any such standards and recommendations (including VVC and HEVC). Unless indicated otherwise, or technically precluded, the aspects described in this application can be used individually or in combination.

Various numeric values are used in the present application, for example, a sub-picture grid having a size of 4×4, a value being in the range of 0-254, etc. The specific values are for example purposes and the aspects described are not limited to these specific values.

FIG. 1 illustrates an encoder 100. Variations of this encoder 100 are contemplated, but the encoder 100 is described below for purposes of clarity without describing all expected variations.

Before being encoded, the video sequence may go through pre-encoding processing (101), for example, applying a color transform to the input color picture (e.g., conversion from RGB 4:4:4 to YCbCr 4:2:0), or performing a remapping of the input picture components in order to get a signal distribution more resilient to compression (for instance using a histogram equalization of one of the color components). Metadata can be associated with the pre-processing, and attached to the bitstream.

In the encoder 100, a picture is encoded by the encoder elements as described below. The picture to be encoded is partitioned (102) and processed in units of, for example, CUs. Each unit is encoded using, for example, either an intra or inter mode. When a unit is encoded in an intra mode, it performs intra prediction (160). In an inter mode, motion estimation (175) and compensation (170) are performed. The encoder decides (105) which one of the intra mode or inter mode to use for encoding the unit, and indicates the intra/inter decision by, for example, a prediction mode flag. Prediction residuals are calculated, for example, by subtracting (110) the predicted block from the original image block.

The prediction residuals are then transformed (125) and quantized (130). The quantized transform coefficients, as well as motion vectors and other syntax elements, are entropy coded (145) to output a bitstream. The encoder can skip the transform and apply quantization directly to the non-transformed residual signal. The encoder can bypass both transform and quantization, i.e., the residual is coded directly without the application of the transform or quantization processes.

The encoder decodes an encoded block to provide a reference for further predictions. The quantized transform coefficients are de-quantized (140) and inverse transformed (150) to decode prediction residuals. Combining (155) the decoded prediction residuals and the predicted block, an image block is reconstructed. In-loop filters (165) are applied to the reconstructed picture to perform, for example, deblocking/SAO (Sample Adaptive Offset) filtering to reduce encoding artifacts. The filtered image is stored at a reference picture buffer (180).

FIG. 2 illustrates a block diagram of a video decoder 200. In the decoder 200, a bitstream is decoded by the decoder elements as described below. Video decoder 200 generally performs a decoding pass reciprocal to the encoding pass as described in FIG. 1. The encoder 100 also generally performs video decoding as part of encoding video data.

In particular, the input of the decoder includes a video bitstream, which can be generated by video encoder 100. The bitstream is first entropy decoded (230) to obtain transform coefficients, motion vectors, and other coded information. The picture partition information indicates how the picture is partitioned. The decoder may therefore divide (235) the picture according to the decoded picture partitioning information. The transform coefficients are de-quantized (240) and inverse transformed (250) to decode the prediction residuals. Combining (255) the decoded prediction residuals and the predicted block, an image block is reconstructed. The predicted block can be obtained (270) from intra prediction (260) or motion-compensated prediction (i.e., inter prediction) (275). In-loop filters (265) are applied to the reconstructed image. The filtered image is stored at a reference picture buffer (280).

The decoded picture can further go through post-decoding processing (285), for example, an inverse color transform (e.g. conversion from YCbCr 4:2:0 to RGB 4:4:4) or an inverse remapping performing the inverse of the remapping process performed in the pre-encoding processing (101). The post-decoding processing can use metadata derived in the pre-encoding processing and signaled in the bitstream.

Figure 3:
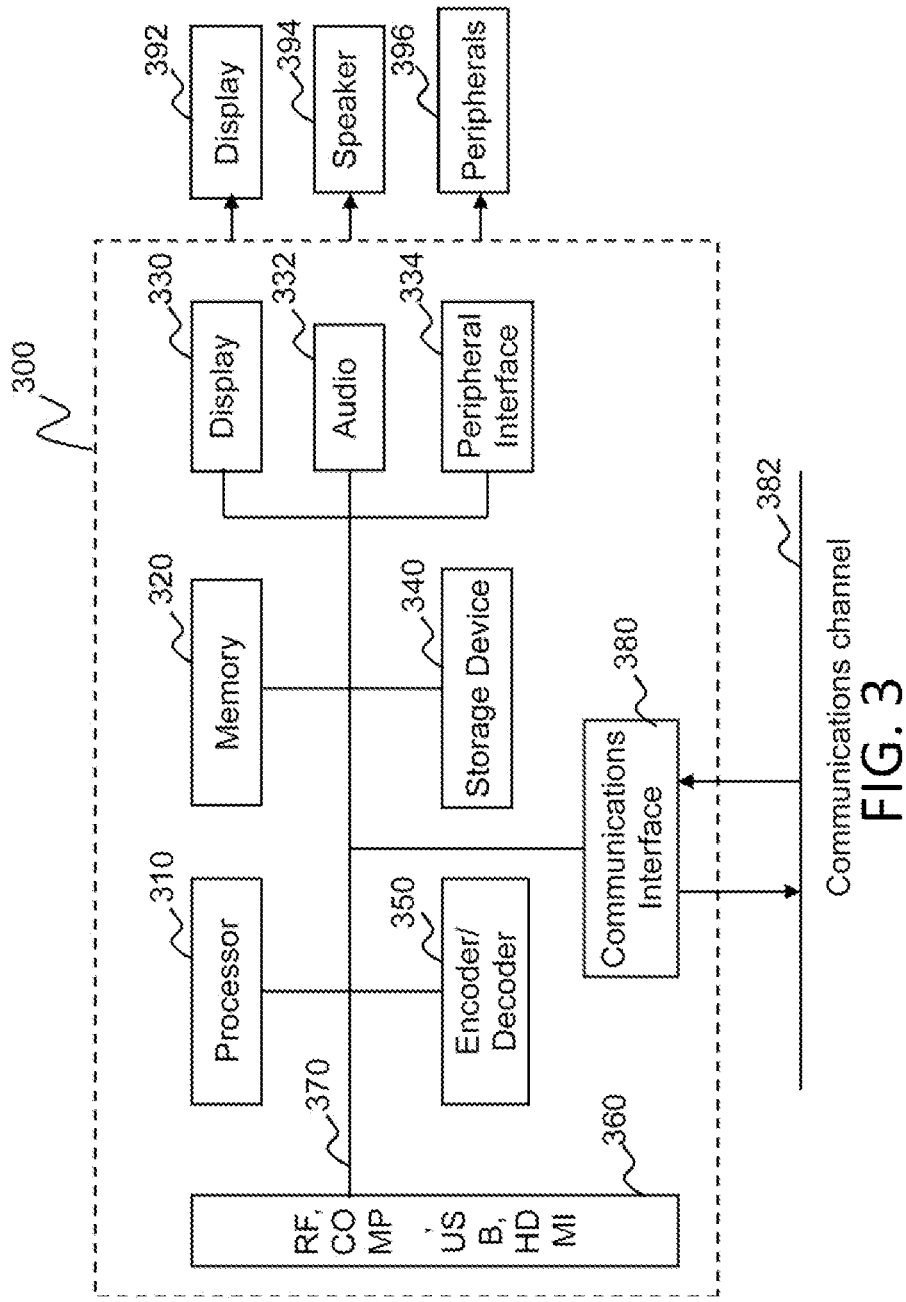
FIG. 3 illustrates a block diagram of an example of a system in which various aspects and examples are implemented.

FIG. 3 illustrates a block diagram of an example of a system in which various aspects and examples are implemented. System 300 can be embodied as a device including the various components described below and is configured to perform one or more of the aspects described in this document. Examples of such devices, include, but are not limited to, various electronic devices such as personal computers, laptop computers, smartphones, tablet computers, digital multimedia set top boxes, digital television receivers, personal video recording systems, connected home appliances, and servers. Elements of system 300, singly or in combination, can be embodied in a single integrated circuit (IC), multiple ICs, and/or discrete components. For example, in at least one example, the processing and encoder/decoder elements of system 300 are distributed across multiple ICs and/or discrete components. In various examples, the system 300 is communicatively coupled to one or more other systems, or other electronic devices, via, for example, a communications bus or through dedicated input and/or output ports. In various examples, the system 300 is configured to implement one or more of the aspects described in this document.

The system 300 includes at least one processor 310 configured to execute instructions loaded therein for implementing, for example, the various aspects described in this document. Processor 310 can include embedded memory, input output interface, and various other circuitries as known in the art. The system 300 includes at least one memory 320 (e.g., a volatile memory device, and/or a non-volatile memory device). System 300 includes a storage device 340, which can include non-volatile memory and/or volatile memory, including, but not limited to, Electrically Erasable Programmable Read-Only Memory (EEPROM), Read-Only Memory (ROM), Programmable Read-Only Memory (PROM), Random Access Memory (RAM), Dynamic Random Access Memory (DRAM), Static Random Access Memory (SRAM), flash, magnetic disk drive, and/or optical disk drive. The storage device 340 can include an internal storage device, an attached storage device (including detachable and non-detachable storage devices), and/or a network accessible storage device, as non-limiting examples.

System 300 includes an encoder/decoder module 350 configured, for example, to process data to provide an encoded video or decoded video, and the encoder/decoder module 350 can include its own processor and memory. The encoder/decoder module 350 represents module(s) that can be included in a device to perform the encoding and/or decoding functions. As is known, a device can include one or both of the encoding and decoding modules. Additionally, encoder/decoder module 350 can be implemented as a separate element of system 300 or can be incorporated within processor 310 as a combination of hardware and software as known to those skilled in the art.

Program code to be loaded onto processor 310 or encoder/decoder 350 to perform the various aspects described in this document can be stored in storage device 340 and subsequently loaded onto memory 320 for execution by processor 310. In accordance with various examples, one or more of processor 310, memory 320, storage device 340, and encoder/decoder module 350 can store one or more of various items during the performance of the processes described in this document. Such stored items can include, but are not limited to, the input video, the decoded video or portions of the decoded video, the bitstream, matrices, variables, and intermediate or final results from the processing of equations, formulas, operations, and operational logic.

In some examples, memory inside of the processor 310 and/or the encoder/decoder module 350 is used to store instructions and to provide working memory for processing that is needed during encoding or decoding. In other examples, however, a memory external to the processing device (for example, the processing device can be either the processor 310 or the encoder/decoder module 350) is used for one or more of these functions. The external memory can be the memory 320 and/or the storage device 340, for example, a dynamic volatile memory and/or a non-volatile flash memory. In several examples, an external non-volatile flash memory is used to store the operating system of, for example, a television. In at least one example, a fast external dynamic volatile memory such as a RAM is used as working memory for video coding and decoding operations, such as for MPEG-2 (MPEG refers to the Moving Picture Experts Group, MPEG-2 is also referred to as ISO/IEC 13818, and 13818-1 is also known as H.222, and 13818-2 is also known as H.262), HEVC (HEVC refers to High Efficiency Video Coding, also known as H.265 and MPEG-H Part 2), or VVC (Versatile Video Coding).

The input to the elements of system 300 can be provided through various input devices as indicated in block 360. Such input devices include, but are not limited to, (i) a radio frequency (RF) portion that receives an RF signal transmitted, for example, over the air by a broadcaster, (ii) a Component (COMP) input terminal (or a set of COMP input terminals), (iii) a Universal Serial Bus (USB) input terminal, and/or (iv) a High Definition Multimedia Interface (HDMI) input terminal. Other examples, not shown in FIG. 3, include composite video.

In various examples, the input devices of block 360 have associated respective input processing elements as known in the art. For example, the RF portion can be associated with elements suitable for (i) selecting a desired frequency (also referred to as selecting a signal, or band-limiting a signal to a band of frequencies), (ii) downconverting the selected signal, (iii) band-limiting again to a narrower band of frequencies to select (for example) a signal frequency band which can be referred to as a channel in certain examples, (iv) demodulating the downconverted and band-limited signal, (v) performing error correction, and (vi) demultiplexing to select the desired stream of data packets. The RF portion of various examples includes one or more elements to perform these functions, for example, frequency selectors, signal selectors, band-limiters, channel selectors, filters, downconverters, demodulators, error correctors, and demultiplexers. The RF portion can include a tuner that performs various of these functions, including, for example, downconverting the received signal to a lower frequency (for example, an intermediate frequency or a near-baseband frequency) or to baseband. In one set-top box example, the RF portion and its associated input processing element receives an RF signal transmitted over a wired (for example, cable) medium, and performs frequency selection by filtering, downconverting, and filtering again to a desired frequency band. Various examples rearrange the order of the above-described (and other) elements, remove some of these elements, and/or add other elements performing similar or different functions. Adding elements can include inserting elements in between existing elements, such as, for example, inserting amplifiers and an analog-to-digital converter. In various examples, the RF portion includes an antenna.

Additionally, the USB and/or HDMI terminals can include respective interface processors for connecting system 300 to other electronic devices across USB and/or HDMI connections. It is to be understood that various aspects of input processing, for example, Reed-Solomon error correction, can be implemented, for example, within a separate input processing IC or within processor 310 as necessary. Similarly, aspects of USB or HDMI interface processing can be implemented within separate interface ICs or within processor 310 as necessary. The demodulated, error corrected, and demultiplexed stream is provided to various processing elements, including, for example, processor 310, and encoder/decoder 350 operating in combination with the memory and storage elements to process the datastream as necessary for presentation on an output device.

Various elements of system 300 can be provided within an integrated housing. Within the integrated housing, the various elements can be interconnected and transmit data therebetween using suitable connection arrangement 370, for example, an internal bus as known in the art, including the Inter-IC (I2C) bus, wiring, and printed circuit boards.

The system 300 includes communication interface 380 that enables communication with other devices via communication channel 382. The communication interface 380 can include, but is not limited to, a transceiver configured to transmit and to receive data over communication channel 382. The communication interface 380 can include, but is not limited to, a modem or network card and the communication channel 382 can be implemented, for example, within a wired and/or a wireless medium.

Data is streamed, or otherwise provided, to the system 300, in various examples, using a wireless network such as a Wi-Fi network, for example IEEE 802.11 (IEEE refers to the Institute of Electrical and Electronics Engineers). The Wi-Fi signal of these examples is received over the communications channel 382 and the communications interface 350 which are adapted for Wi-Fi communications. The communications channel 382 of these examples is typically connected to an access point or router that provides access to external networks including the Internet for allowing streaming applications and other over-the-top communications. Other examples provide streamed data to the system 300 using a set-top box that delivers the data over the HDMI connection of the input block 360. Still other examples provide streamed data to the system 300 using the RF connection of the input block 360. As indicated above, various examples provide data in a non-streaming manner. Additionally, various examples use wireless networks other than Wi-Fi, for example a cellular network or a Bluetooth network.

The system 300 can provide an output signal to various output devices, including a display 392, speakers 394, and other peripheral devices 396. The display 392 of various examples includes one or more of, for example, a touchscreen display, an organic light-emitting diode (OLED) display, a curved display, and/or a foldable display. The display 392 can be for a television, a tablet, a laptop, a cell phone (mobile phone), or other device. The display 392 can also be integrated with other components (for example, as in a smart phone), or separate (for example, an external monitor for a laptop). The other peripheral devices 396 include, in various examples of examples, one or more of a stand-alone digital video disc (or digital versatile disc) (DVR, for both terms), a disk player, a stereo system, and/or a lighting system. Various examples use one or more peripheral devices 396 that provide a function based on the output of the system 300. For example, a disk player performs the function of playing the output of the system 300.

In various examples, control signals are communicated between the system 300 and the display 392, speakers 394, or other peripheral devices 396 using signaling such as AV.Link, Consumer Electronics Control (CEC), or other communications protocols that enable device-to-device control with or without user intervention. The output devices can be communicatively coupled to system 300 via dedicated connections through respective interfaces 330, 332, and 334. Alternatively, the output devices can be connected to system 300 using the communications channel 382 via the communications interface 380. The display 392 and speakers 394 can be integrated in a single unit with the other components of system 300 in an electronic device such as, for example, a television. In various examples, the display interface 330 includes a display driver, such as, for example, a timing controller (T Con) chip.

The display 392 and speakers 394 can alternatively be separate from one or more of the other components, for example, if the RF portion of input 370 is part of a separate set-top box. In various examples in which the display 392 and speakers 394 are external components, the output signal can be provided via dedicated output connections, including, for example, HDMI ports, USB ports, or COMP outputs.

The examples can be carried out by computer software implemented by the processor 310 or by hardware, or by a combination of hardware and software. As a non-limiting example, the examples can be implemented by one or more integrated circuits. The memory 320 can be of any type appropriate to the technical environment and can be implemented using any appropriate data storage technology, such as optical memory devices, magnetic memory devices, semiconductor-based memory devices, fixed memory, and removable memory, as non-limiting examples. The processor 310 can be of any type appropriate to the technical environment, and can encompass one or more of microprocessors, general purpose computers, special purpose computers, and processors based on a multi-core architecture, as non-limiting examples.

Various implementations involve decoding. "Decoding", as used in this application, can encompass all or part of the processes performed, for example, on a received encoded sequence in order to produce a final output suitable for display. In various examples, such processes include one or more of the processes typically performed by a decoder, for example, entropy decoding, inverse quantization, inverse transformation, and differential decoding. In various examples, such processes also, or alternatively, include processes performed by a decoder of various implementations described in this application, for example, receiving an indication of sub-picture level wrap-around motion compensation, performing luma sample bilinear interpolation, etc.

As further examples, in one example "decoding" refers only to entropy decoding, in another example "decoding" refers only to differential decoding, and in another example "decoding" refers to a combination of entropy decoding and differential decoding. Whether the phrase "decoding process" is intended to refer specifically to a subset of operations or generally to the broader decoding process will be clear based on the context of the specific descriptions and is believed to be well understood by those skilled in the art.

Various implementations involve encoding. In an analogous way to the above discussion about "decoding", "encoding" as used in this application can encompass all or part of the processes performed, for example, on an input video sequence in order to produce an encoded bitstream. In various examples, such processes include one or more of the processes typically performed by an encoder, for example, partitioning, differential encoding, transformation, quantization, and entropy encoding. In various examples, such processes also, or alternatively, include processes performed by an encoder of various implementations described in this application, for example, determining whether wrap-around motion compensation (e.g., such as geometric padding) should be enabled or disabled for an individual sub-picture.

As further examples, in one example "encoding" refers only to entropy encoding, in another example "encoding" refers only to differential encoding, and in another example "encoding" refers to a combination of differential encoding and entropy encoding. Whether the phrase "encoding process" is intended to refer specifically to a subset of operations or generally to the broader encoding process will be clear based on the context of the specific descriptions and is believed to be well understood by those skilled in the art.

Note that the syntax elements as used herein, for example, subpic_wraparound_enabled_flag, subpic_ref_wraparound_offset_minus1, etc., are descriptive terms. As such, they do not preclude the use of other syntax element names.

When a figure is presented as a flow diagram, it should be understood that it also provides a block diagram of a corresponding apparatus. Similarly, when a figure is presented as a block diagram, it should be understood that it also provides a flow diagram of a corresponding method/process.

Various examples refer to rate distortion optimization. In particular, during the encoding process, the balance or trade-off between the rate and distortion is usually considered, often given the constraints of computational complexity. The rate distortion optimization is usually formulated as minimizing a rate distortion function, which is a weighted sum of the rate and of the distortion. There are different approaches to solve the rate distortion optimization problem. For example, the approaches may be based on an extensive testing of all encoding options, including all considered modes or coding parameters values, with a complete evaluation of their coding cost and related distortion of the reconstructed signal after coding and decoding. Faster approaches may also be used, to save encoding complexity, in particular with computation of an approximated distortion based on the prediction or the prediction residual signal, not the reconstructed one. Mix of these two approaches can also be used, such as by using an approximated distortion for only some of the possible encoding options, and a complete distortion for other encoding options. Other approaches only evaluate a subset of the possible encoding options. More generally, many approaches employ any of a variety of techniques to perform the optimization, but the optimization is not necessarily a complete evaluation of both the coding cost and related distortion.

The implementations and aspects described herein can be implemented in, for example, a method or a process, an apparatus, a software program, a data stream, or a signal. Even if only discussed in the context of a single form of implementation (for example, discussed only as a method), the implementation of features discussed can also be implemented in other forms (for example, an apparatus or program). An apparatus can be implemented in, for example, appropriate hardware, software, and firmware. The methods can be implemented in, for example, a processor, which refers to processing devices in general, including, for example, a computer, a microprocessor, an integrated circuit, or a programmable logic device. Processors also include communication devices, such as, for example, computers, cell phones, portable/personal digital assistants ("PDAs"), and other devices that facilitate communication of information between end-users.

Reference to "one example" or "an example" or "one implementation" or "an implementation", as well as other variations thereof, means that a particular feature, structure, characteristic, and so forth described in connection with the example is included in at least one example. Thus, the appearances of the phrase "in one example" or "in an example" or "in one implementation" or "in an implementation", as well any other variations, appearing in various places throughout this application are not necessarily all referring to the same example.

Additionally, this application may refer to "determining" various pieces of information. Determining the information can include one or more of, for example, estimating the information, calculating the information, predicting the information, or retrieving the information from memory.

Further, this application may refer to "accessing" various pieces of information. Accessing the information can include one or more of, for example, receiving the information, retrieving the information (for example, from memory), storing the information, moving the information, copying the information, calculating the information, determining the information, predicting the information, or estimating the information.

Additionally, this application may refer to "receiving" various pieces of information. Receiving is, as with "accessing", intended to be a broad term. Receiving the information can include one or more of, for example, accessing the information, or retrieving the information (for example, from memory). Further, "receiving" is typically involved, in one way or another, during operations such as, for example, storing the information, processing the information, transmitting the information, moving the information, copying the information, erasing the information, calculating the information, determining the information, predicting the information, or estimating the information.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended, as is clear to one of ordinary skill in this and related arts, for as many items as are listed.

Also, as used herein, the word "signal" refers to, among other things, indicating something to a corresponding decoder. For example, in certain examples the encoder signals a particular one of a plurality of parameters for sub-picture coding. In this way, in an example the same parameter is used at both the encoder side and the decoder side. Thus, for example, an encoder can transmit (explicit signaling) a particular parameter to the decoder so that the decoder can use the same particular parameter. Conversely, if the decoder already has the particular parameter as well as others, then signaling can be used without transmitting (implicit signaling) to simply allow the decoder to know and select the particular parameter. By avoiding transmission of any actual functions, a bit savings is realized in various examples. It is to be appreciated that signaling can be accomplished in a variety of ways. For example, one or more syntax elements, flags, and so forth are used to signal information to a corresponding decoder in various examples. While the preceding relates to the verb form of the word "signal", the word "signal" can also be used herein as a noun.

As will be evident to one of ordinary skill in the art, implementations can produce a variety of signals formatted to carry information that can be, for example, stored or transmitted. The information can include, for example, instructions for performing a method, or data produced by one of the described implementations. For example, a signal can be formatted to carry the bitstream of a described example. Such a signal can be formatted, for example, as an electromagnetic wave (for example, using a radio frequency portion of spectrum) or as a baseband signal. The formatting can include, for example, encoding a data stream and modulating a carrier with the encoded data stream. The information that the signal carries can be, for example, analog or digital information. The signal can be transmitted over a variety of different wired or wireless links, as is known. The signal can be stored on a processor-readable medium.

Figure 4:
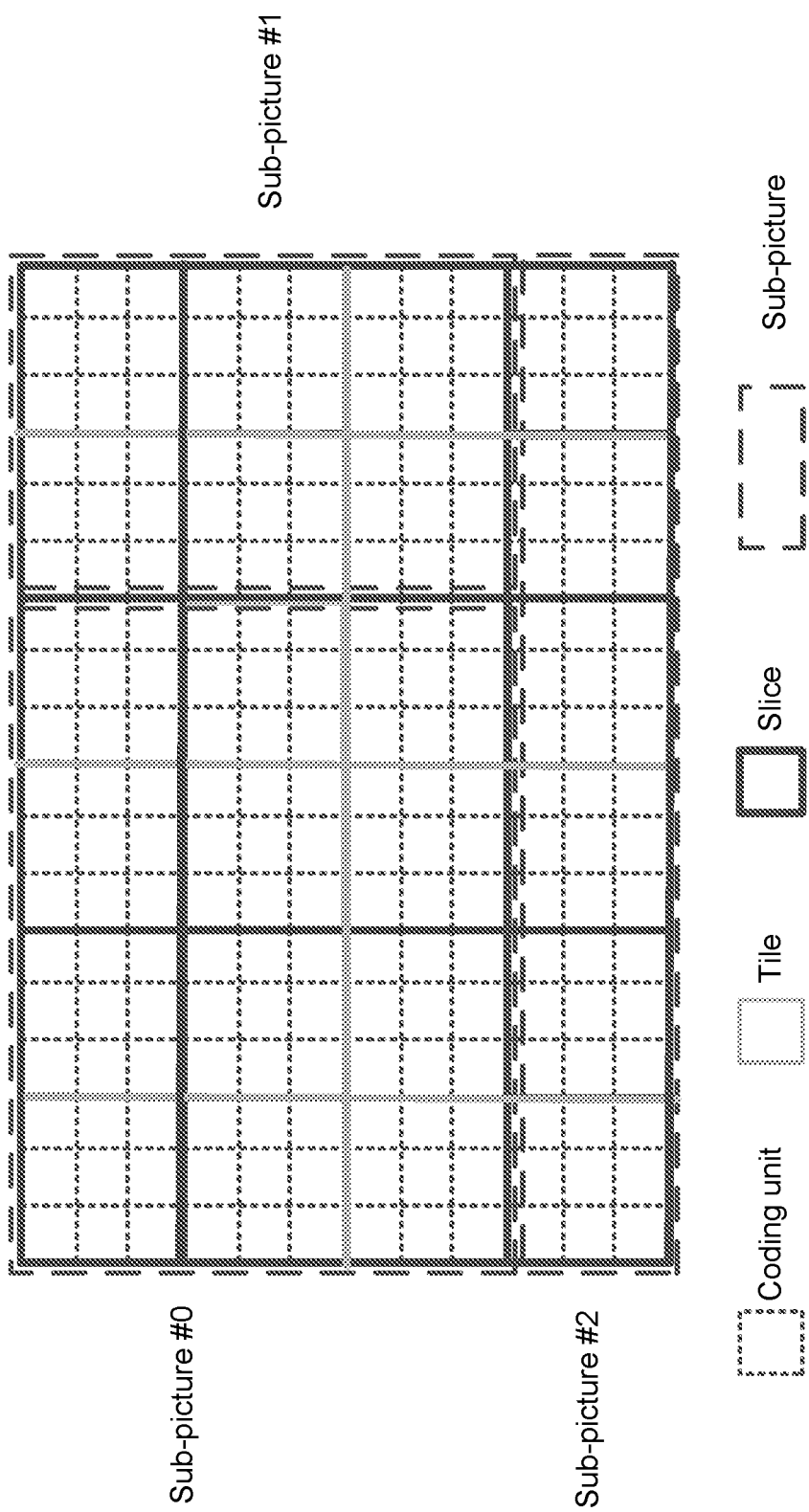
FIG. 4 is a diagram illustrating an example picture partitioned into tiles and slices.

A video processing apparatus as described herein may be configured to partition a picture into one or more rows and/or columns of tiles and/or one or more sub-pictures. A tile may comprise a sequence of coding tree units (CTUs) that may cover a rectangular region of the picture. In examples, a tile may be further divided into one or more bricks and each brick may comprise one or more rows of CTUs of the tile. A sub-picture may comprise one or more slices that may collectively cover a region (e.g., a rectangular region) of the picture. A slice may be a rectangular slice, a raster scan slice, etc. A raster scan slice (e.g., generated and/or used in a raster scan slice mode) may comprise one or more tiles (e.g., a sequence of tiles) that may be derived via a tile raster scan of the picture. A rectangular slice (e.g., generated and/or used in a rectangular slice mode) may comprise one or more bricks that may collectively form a region (e.g., a rectangular region) of a picture. The bricks within a rectangular slice may be arranged based on the order of a brick raster scan of the corresponding slice. FIG. 4 shows an example of a picture partitioned into sub-pictures, slices (e.g., rectangular slices), tiles, and coding units (e.g., CTUs).

A video processing apparatus as described herein may be configured to transmit (e.g., if the video processing apparatus includes a video encoder) or receive (e.g., if the video processing apparatus include a video decoder) a sequence parameter set (SPS) and/or a picture parameter set (PPS). The SPS may include syntax elements (e.g., parameters) that define a sub-picture grid of a picture, syntax elements (e.g., subpic_treated_as_pic_flag) that indicate whether a sub-picture of a coded picture (e.g., in a coded video sequence (CVS)) may be treated as a picture in the decoding process (e.g., except for in-loop filtering operations), etc. The PPS may include syntax elements (e.g., parameters) that define a tile and/or a brick grid, syntax elements that indicate whether wrap-around motion compensation (e.g., horizontal wrap-around motion compensation) is enabled, etc.

Figure 5:
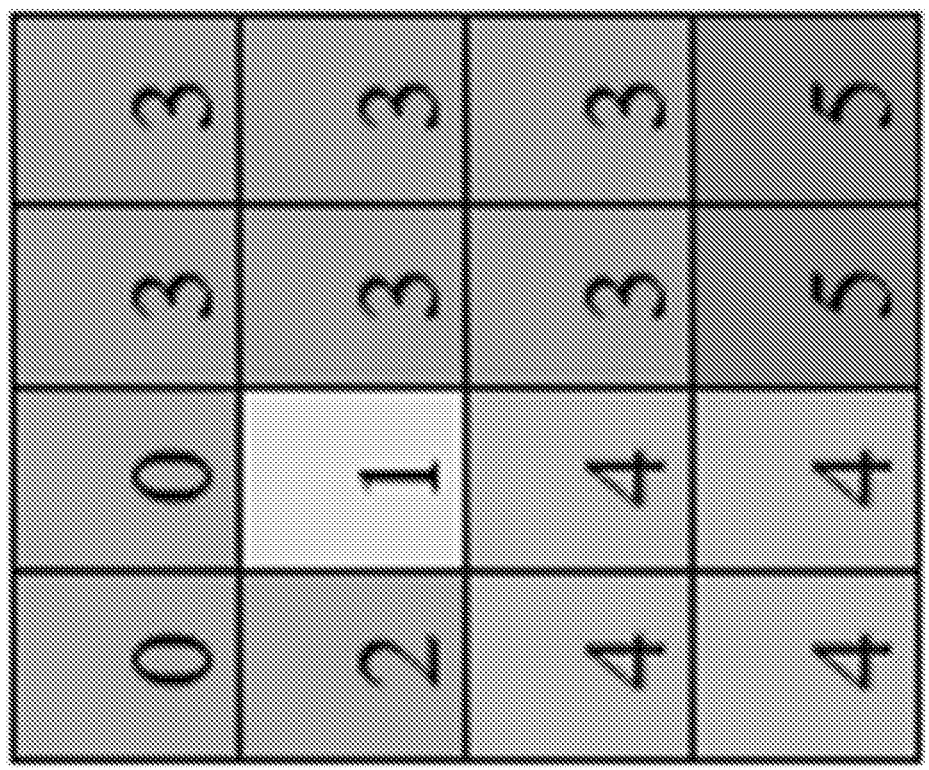
FIG. 5 is a diagram illustrating an example sub-picture grid that may be used to indicate sub-picture ID.

A SPS may specify sub-picture sizes and/or positions, for example, using a grid. FIG. 5 shows an example of a sub-picture grid that may be used to indicate sub-picture identifiers (IDs) (e.g., using numerical values such as 0, 1, . . . 5, etc.). As shown in FIG. 5, a coded picture may be partitioned (e.g., split) into a grid. The number of rows and columns of the grid may be determined based on the size of a grid element and/or the size of the coded picture. Table 1 below includes example syntax for signaling a sub-picture ID (e.g., sub_pic_id[i][j]) at a (i, j)-th grid position.

TABLE 1

Example SPS syntax

| | Descriptor |
|---|---|
| seq_parameter_set_rbsp( ) { | |
| ... | |
|   subpics_present_flag | u(1) |
|   if( subpics_present_flag ) { | |
|     max_subpics_minus1 | u(8) |
|     subpic_grid_col_width_minus1 | u(v) |
|     subpic_grid_row_height_minus1 | u(v) |
|     for( i = 0; i < NumSubPicGridRows; i++ ) | |
|       for( j = 0; j < NumSubPicGridCols; j++ ) | |
|         subpic_grid_idx[ i ][ j ] | u(v) |
|     for( i = 0; i <= NumSubPics; i++ ) { | |
|       subpic_treated_as_pic_flag[ i ] | u(1) |
|       loop_filter_across_subpic_enabled_flag[ i ] | u(1) |
|     } | |
|   } | |
| ... | |
| } | |

A video processing apparatus as described herein may be configured to perform wrap-around motion compensation while processing a picture. Such wrap-around motion compensation may be performed, for example, in a horizontal direction. A SPS and/or a PPS may include elements that indicate whether wrap-around motion compensation is enabled. For example, a SPS may include a first parameter (e.g., sps_ref_wraparound_enabled_flag) that indicates whether horizontal wrap-around motion compensation is enabled or disabled for inter prediction (e.g., by setting sps_ref_wraparound_enabled_flag to 1 or 0, respectively). The SPS may also include a second parameter (e.g., sps_ref_wraparound_offset_minus1 plus 1) that may specify an offset that may be used to compute a horizontal wrap-around position.

Figure 6:
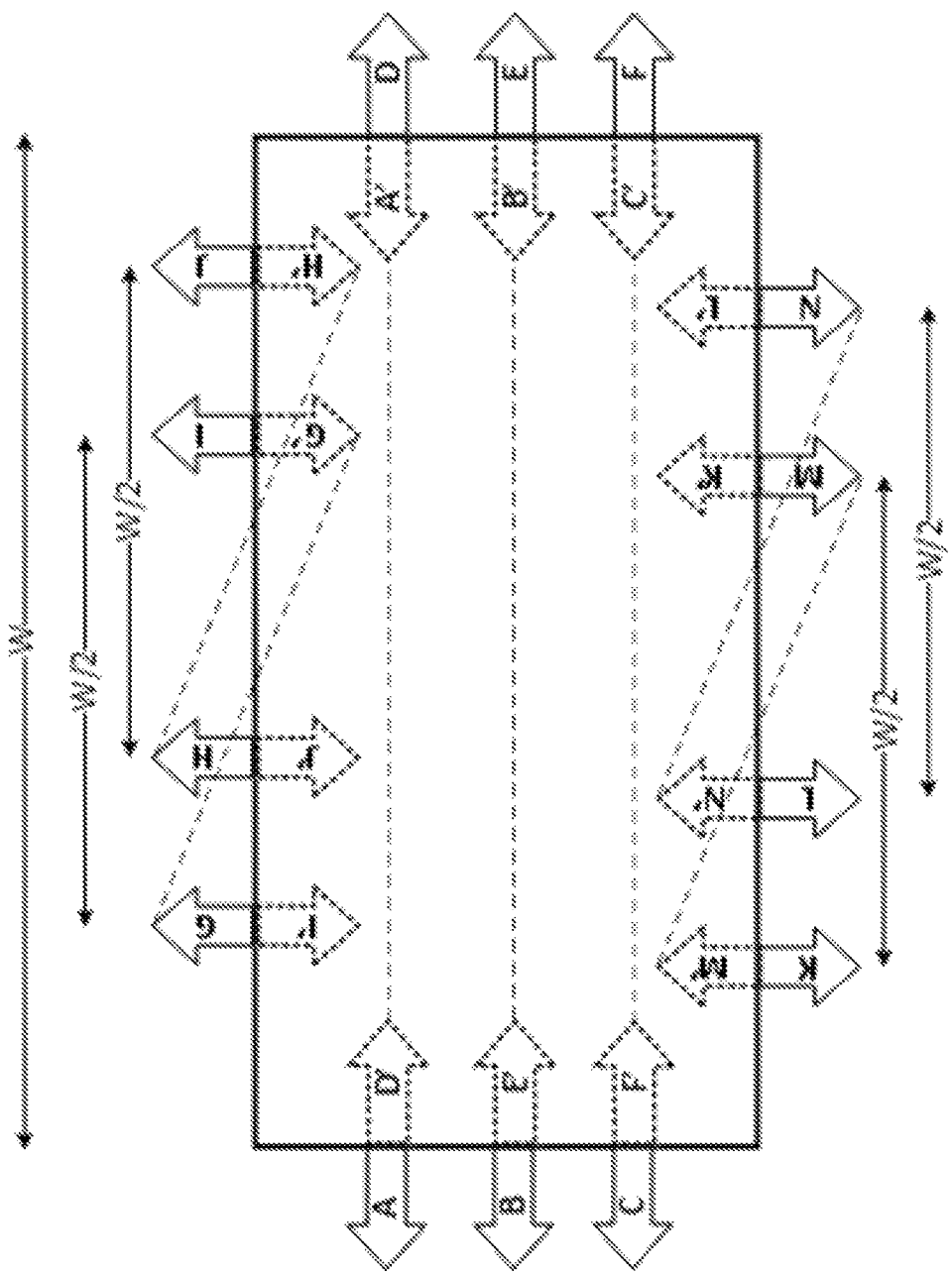
FIG. 6 is a diagram illustrating an example of applying wrap-around for original and merged pictures.

A video processing apparatus as described herein may be configured to perform geometry padding (e.g., horizontal geometry padding) when wrap-around motion compensation (e.g., horizontal wrap-around motion compensation) is enabled. FIG. 6 shows an example geometry padding process for a 360° video in equirectangular projection format (ERP). As shown, a video processing apparatus may be configured to pad samples at the A, B, C, D, E and/or F positions (e.g., along a left and/or a right boundary of a picture) with samples at the D', E', F', A', B', and/or C' positions. Along a top boundary, the video processing apparatus may be configured to pad the samples at the G, H, I and/or J positions with samples at the I', J', G', and/or H' positions. Along a bottom boundary, the video processing apparatus may be configured to pad the samples at the K, L, M and/or N positions with sample at M', N', K', and/or L' positions.

A video processing apparatus as described herein may be configured to support an access unit delimiter (AUD), which may be signaled in a video bitstream and/or an AUD network abstraction layer (NAL) unit (e.g., for standard-compliant videos). Table 2 below shows example AUD syntax. The syntax may include an element (e.g., pic_type)

that indicates a slice_type value that may be present in a coded picture. Further, an access unit (e.g., each access unit) may start with an AUD NAL unit in the syntax and/or there may one (e.g., at most one) AUD NAL unit in a layer access unit according to the syntax.

TABLE 2

Example AUD syntax

| | Descriptor |
|---|---|
| access_unit_delimiter_rbsp( ) { | |
|   pic_type | u(3) |
|   rbsp_trailing_bits( ) | |
| } | |

In examples (e.g., when an AUD is mandated for an (e.g., each) access unit or AU), one or more syntax elements such as those signaled in a slice header with constraints to have the same value within a coding picture may be signaled in an AUD (e.g., instead of in a slice header) to reduce signaling overhead. An AUD and a parameter set may be interdependent, and the interdependence may be explored to improve coding efficiency. In examples (e.g., in sub-picture coding, when the left and/or right boundary of an ERP picture are not connected, etc.), it may be desirable to enable or disable wrap-around motion compensation (e.g., such as geometric padding) for individual sub-pictures. A mechanism that does not allow enabling or disabling wrap-around motion compensation for individual sub-pictures (e.g., by only signaling a wrap-around enabling flag in the SPS) may be insufficient.

A video processing apparatus as described herein may be configured to process video contents using various coding tools and/or high-level syntax (HLS). The coding tools may facilitate intra prediction, inter prediction, transform, quantization, entropy coding, in-loop filters, etc. The HLS may support partitioning of pictures, sub-pictures, slices, tiles and bricks (e.g., for parallelization), applications such as 360-degree video viewport dependent processing, etc. The HLS may also support features such as scalable video coding, reference picture resampling (RPR), gradual decoding refresh (GDR), etc.

A slice header associated with a coded picture may include one or more syntax elements such as slice_pic_parameter_set_id, non_reference_picture_flag, colour_plane_id, slice_pic_order_cnt_lsb, recovery_poc_cnt, no_output_of_prior_pics_flag, pic_output_flag, and/or slice_temporal_mvp_enabled_flag. The respective values of these syntax elements may be the same in multiple (e.g., all) slice headers associated with the coded picture. One or more of these syntax elements (e.g., slice_pic_parameter_set_id, non_reference_picture_flag, colour_plane_id, slice_pic_order_cnt_lsb, recovery_poc_cnt, no_output_of_prior_pics_flag, pic_output_flag, slice_temporal_mvp_enabled_flag, etc.) may be signaled in a picture header (e.g., instead of in multiple slice headers) or in a layer access unit delimiter (a layer AUD), and doing so may reduce the costs associated with slice overhead. A layer AUD may correspond to a NAL unit type and may be used to indicate the boundary of a layer coded picture.

An access unit may comprise pictures from different layers. One or more (e.g., all) pictures within the access unit may share the same output time instance and/or the same picture order count (POC) value. One or more syntax elements (e.g., such as slice_pic_order_cnt_lsb) may be signaled in an AUD (e.g., instead of in a slice header). Dependency between the AUD and one or more slices may be introduced when the one or more syntax elements (e.g., such as slice_pic_order_cnt_lsb) are signaled in the AUD. Table 3 below shows example syntax elements that may be included in an AUD. As shown, the syntax may include an aud_pic_order_cnt_isb element the value of which may otherwise be included in multiple slice headers (e.g., as slice_pic_order_cnt_lsb).

TABLE 3

Example syntax elements placed in an AUD

| | Descriptor |
|---|---|
| access_unit_delimiter_rbsp( ) { | |
|   pic_type | u(3) |
|   aud_pic_order_cnt_lsb | u(v) |
|   rbsp_trailing_bits( ) | |
| } | |

A non-reference picture property may be signaled in a slice header, for example, to indicate a sub-layer reference property and/or a non-reference property for a picture. A video processing apparatus (e.g., a decoder) receiving the signaled information may determine, based on the signaled information, that one or more pictures can be discarded under certain situations (e.g., when playback is lagging). In examples (e.g., when a multiple-layer coding structure is used), a non-reference layer not referenced by other layers may be indicated at a Video Parameter Set (VPS) level or a SPS level so that one or more pictures of the non-reference layer may be discarded. Table 4 below shows example VPS syntax including an element (e.g., vps_non_reference_layer_flag) that indicates that a certain layer (e.g., a non-reference layer) may not be referenced by other layers (e.g., may not be a direct reference layer for the other layers).

TABLE 4

Example VPS syntax indicating that a non-reference layer is not referenced by other layers

| | Descriptor |
|---|---|
| video_parameter_set_rbsp( ) { | |
|   vps_video_parameter_set_id | u(4) |
|   vps_max_layers_minus1 | u(6) |
|   if( vps_max_layers_minus1 > 0 ) | |
|     vps_all_independent_layers_flag | u(1) |
|   for( i = 0; i <= vps_max_layers_minus1; i++ ) { | |
|     vps_layer_id[ i ] | u(6) |
|     if( i > 0 && !vps_all_independent_layers_flag ) { | |
|       vps_independent_layer_flag[ i ] | u(1) |
|       if (!vps_independent_layer_flag[ i ]) | |
|         vps_non_reference_layer_flag[ i ] | u(1) |
|       if( !vps_independent_layer_flag[ i ] ) | |
|         for( j = 0; j < i; j++ ) | |
|           vps_direct_dependency_flag[ i ][ j ] | u(1) |
|     } | |
|   } | |
|   ... | |
| } | |

In the example syntax shown in Table 4, setting the value of parameter vps_non_reference_layer_flag[i] to 1 (or another suitable value) may indicate that the i-th layer may not be used (e.g., by another layer such as a j-th layer) as a reference layer for inter-layer prediction. Conversely, setting the value of vps_non_reference_layer_flag[i] to 0 (or another suitable value) may indicate that the i-th layer may or may not be used (e.g., by another layer such as a j-th layer) as a reference layer for inter-layer prediction.

A video processing apparatus as described herein may be configured to send or receive a syntax element (e.g., via a video bitstream) indicating whether wrap-around motion compensation is enabled or disabled for a sub-picture. Table 5 below shows example SPS syntax in which an element associated with wrap-around motion compensation (e.g., sps_ref_wraparound_enabled_flag) may be signaled (e.g., after one or more elements associated with sub-picture partitioning).

TABLE 5

Example SPS syntax including a wrap-around indicator

| | Descriptor |
|---|---|
| seq_parameter_set_rbsp( ) { | \ |
| ... | |
| subpics_present_flag | u(1) |
| if( subpics_present_flag ) { | |
|   max_subpics_minus1 | u(8) |
|   subpic_grid_col_width_minus1 | u(v) |
|   subpic_grid_row_height_minus1 | u(v) |
|   for( i = 0; i < NumSubPicGridRows; i++ ) | |
|     for( j = 0; j <NumSubPicGridCols; j++ ) | |
|       subpic_grid_idx[ i ][ j ] | u(v) |
|   for( i = 0; i <= NumSubPics; i++ ) { | |
|     subpic_treated_as_pic_flag[ i ] | u(1) |
|     loop_filter_across_subpic_enabled_flag[ i ] | u(1) |
|   } | |
| } | |
| ... | |
| sps_ref_wraparound_enabled_flag | u(1) |
| if( sps_ref_wraparound_enabled_flag ) | |
|   sps_ref_wraparound_offset_minus1 | ue(v) |
| ... | |
| rbsp_trailing_bits( ) | |
| } | |

In examples (e.g., in viewport dependent streaming), wrap-around motion compensation may or may not be applied to a particular sub-picture such as a sub-picture within a sub-picture merged picture.

Figure 7:
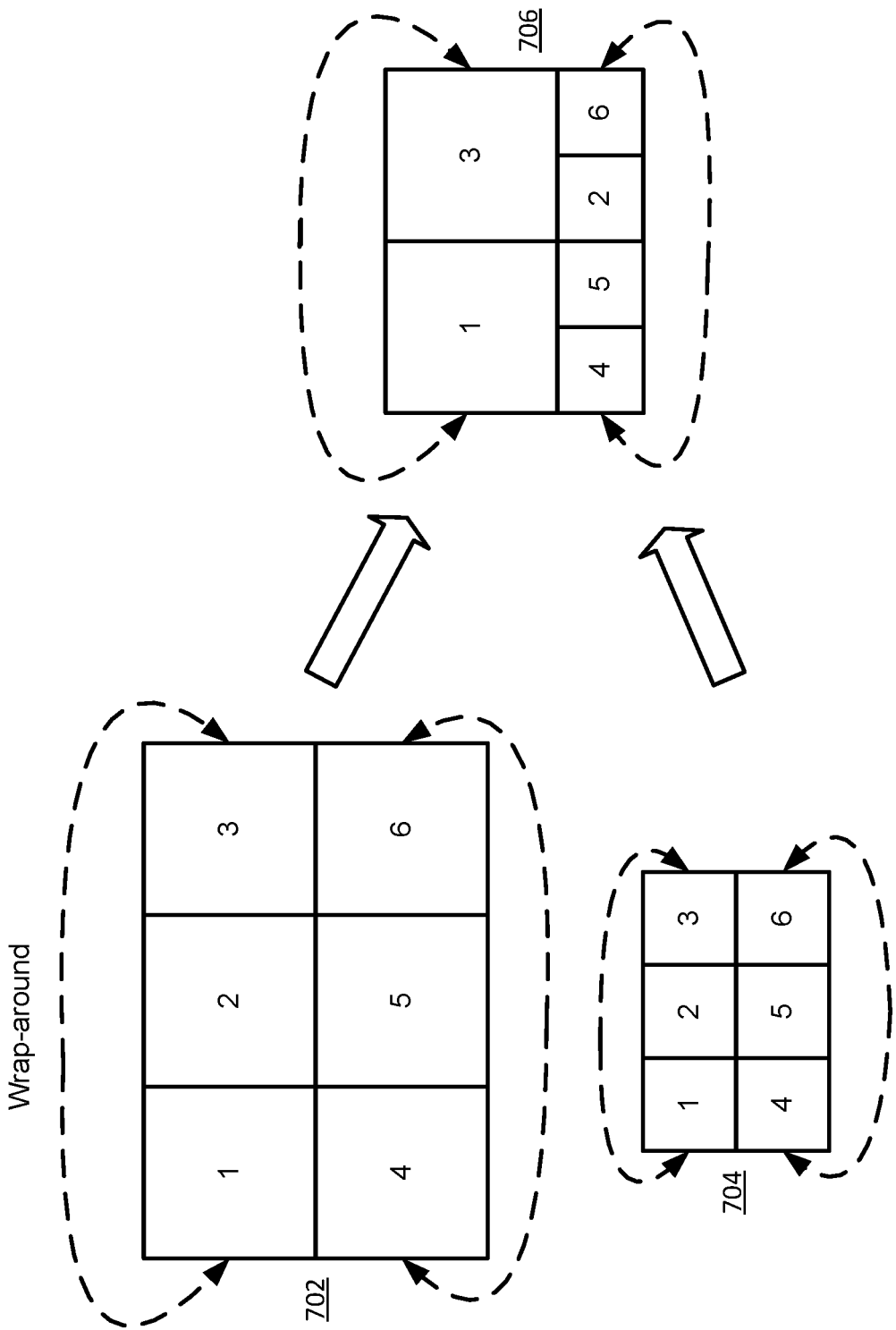
FIG. 7 is a diagram illustrating an example of applying geometry padding for an equirectangular projection format (ERP).

FIG. 7 shows examples of wrap-around motion compensation for an original picture and a merged picture. An original 360-degree picture may be encoded into a set of one or more high-resolution pictures (e.g., represented by 1-6 of 702) and/or a set of one or more low-resolution pictures (e.g., represented by 1-6 of 704). Wrap-around motion compensation may be applied to these pictures (e.g., the high-resolution pictures of 702 and the low-resolution pictures of 704) with respective (e.g., different) wrap-around offsets. A new picture 706 comprising two high resolution sub-pictures (e.g., represented by 1 and 3 in FIG. 7) and four low resolution sub-pictures (e.g., represented by 4, 5, 2 and 6 in FIG. 7) may be derived, for example, via extraction and/or merging. Sub-pictures 1 and 3 may be grouped into a first sub-picture and sub-pictures 4, 5, 2 and 6 may be grouped into a second sub-picture. In situations like this, it may be desirable to apply different wrap-around motion compensation (e.g., different wrap-around offsets) to the first and second sub-pictures.

A video processing apparatus as described herein may be configured to send or receive an indication (e.g., via a video bitstream) of whether wrap-around motion compensation is enabled or disabled for a sub-picture (e.g., per sub-picture) and/or an indication (e.g., via the video bitstream) of a wrap-around offset to be applied (e.g., when wrap-around motion compensation is enabled) to the sub-picture. For example, an video encoding apparatus as described herein may be configured to code a picture that includes a first sub-picture and/or a second sub-picture. The video encoding apparatus may obtain information that indicates whether wrap-around motion compensation is enabled for the first and/or second sub-pictures of the coded picture and respective wrap-around offsets associated with the first and second sub-pictures. The video encoding apparatus may then form a set of coded data that includes the coded picture and the obtained information. In examples, the obtained information included in the set of coded data may indicate that wrap-around motion compensation is enabled for the first sub-picture and disabled for the second sub-picture. In examples, the obtained information included in the set of coded data may comprise a picture parameter set (PPS) syntax element that indicates that wrap-around motion compensation is enabled and a sequence parameter set (SPS) syntax element that indicates that the first sub-picture is to be treated as a picture. In examples, the video encoding apparatus may be configured to transmit the set of coded data to a receiving device such as a video decoding apparatus.

The sub-picture level wrap-around indications described herein may be provided, for example, when an indication for treating a sub-picture as a picture (e.g., subpic_treated_as_pic_flag) is set to true or one, and when an SPS indication relating to wrap-around motion compensation (e.g., sps_ref_wraparound_enabled_flag) is also set to true or 1. Table 6 below shows an example PPS syntax structure for signaling a number (e.g., a maximum number) of sub-pictures, a wrap-around motion compensation enable/disable indication (e.g., for a sub-picture), a wrap-around motion compensation offset (e.g., for a sub-picture), etc. Although shown as being signaled in a PPS, one or more of the syntax elements in Table 6 may also be signaled in a SPS.

TABLE 6

Example PPS syntax including wrap-around flags and offsets

| | Descriptor |
|---|---|
| picture_parameter_set_rbsp( ) { | \ |
| ... | |
| subpics_present_flag | u(1) |
| if( subpics_present flag ) { | |
|   max_subpics_minus2 | u(8) |
|   subpic_grid_col_width_minus1 | u(v) |
|   subpic_grid_row_height_minus1 | u(v) |
|   for( i = 0; i < NumSubPicGridRows; i++ ) | |
|     for( j = 0; j < NumSubPicGridCols; j++ ) | |
|       subpic_grid_idx[ i ] [ j ] | u(v) |
|   for( i = 0; i <= NumSubPics; i++ ) { | |
|     subpic_treated_as_pic_flag[ i ] | u(1) |
|     if ( subpic_treated_as_pic_flag[ i ] && | |
|     sps_ref_wraparound_enabled_flag ) { | |
|       all_subpic_wraparound_enabled_flag | u(1) |
|       subpic_wraparound_offset_sps_flag | u(1) |
|       if (!all_subpic_wraparound_enabled_flag) | |
|         subpic_wraparound_enabled_flag[ i ] | u(1) |
|       if(subpic_wraparound_enabled_flag[i] && | |
| !subpic_wraparound_offset_sps_flag) | |
|         subpic_ref_wraparound_offset_minus1[ i ] | ue(v) |
|     } | |
|     loop_filter_across_subpic_enabled_flag[ i ] | u(1) |
|   } | |
|   } | |
| } | |
| ... | |
| rbsp_trailing_bits( ) | |
| } | |

The example syntax shown in Table 6 may include an element, e.g., max_subpics_minus2 plus 2, that specifies the maximum number of sub-pictures that may be present in a code video sequence (CVS). The value of this element may range from 0 to 254 (e.g., 255 may be reserved for future use). The example syntax may include an element, e.g., all_subpic_wraparound_enabled_flag, that indicates whether wrap-around motion compensation is enabled (e.g., when the element has a value of 1) for one or more sub-pictures (e.g., for all sub-pictures) or disabled/skipped (e.g., when the element has a value of zero) for at least one sub-picture (e.g., wrap-around is not applied to all sub-pictures). When this element (e.g., all_subpic_wraparound_enabled_flag) is not present, its value may be inferred to be equal to 0.

The example syntax shown in Table 6 may include an element, e.g., subpic_wraparound_offset_sps_flag, that indicates whether a sub-picture wrap-around motion compensation offset is to be inferred to be equal to the value of sps_ref_wraparound_offset_minus1 plus 1 (e.g., when subpic_wraparound_offset_sps_flag is set to 1) or be specified by another element such as subpic_wraparound_offset_minus1 (e.g., when subpic_wraparound_offset_sps_flag is set to zero).

The example syntax shown in Table 6 may include an element, e.g., subpic_ref_wraparound_enabled_flag[i], that indicates whether wrap-around motion compensation (e.g., horizontal wrap-around motion compensation) is enabled or disabled for the i-th sub-picture (e.g., for the inter-prediction of the i-th sub-picture). When this element is set to one, it may indicate that horizontal wrap-around motion compensation is enabled (e.g., applied) for the i-th sub-picture. When this element is set to zero, it may indicate that horizontal wrap-around motion compensation is disabled (e.g., not applied) for the i-th sub-picture. When this element is not present in the signaled syntax, its value may be inferred, for example, to be equal to the value of the all_subpic_wraparound_enabled_flag element described herein.

The example syntax shown in Table 6 may include an element, e.g., subpic_ref_wraparound_offset_minus1 plus 1, that specifies the offset associated with the wrap-around motion compensation (e.g., for computing the horizontal wrap-around position of the i-th sub-picture). The offset value may be specified in units of MinCbSizeY luma samples. For example, the value of subpic_ref_wraparound_offset_minus1 may be set in the range of (CtbSizeY/MinCbSizeY)+1 to subpic_width_in_luma_samples[i]/MinCbSizeY)−1, inclusive, where subpic_width_in_luma_samples [i] may represent the width of the i-th sub-picture in luma samples. When this element (e.g., subpic_ref_wraparound_offset_minus1) is not present, its value may be inferred, for example, to be equal to the value of the sps_ref_wraparound_offset_minus1 element described herein.

A video processing apparatus as described herein may apply wrap-around motion compensation for sub-pictures (e.g., for sub-picture boundaries) based on the syntax elements described herein. For example, when performing luma sample bilinear interpolation (e.g., when determining the luma locations in a full-sample unit (xInt$_i$, yInt$_i$), the video processing apparatus may consider a sub-picture wrap-around motion compensation indicator (e.g., subpic_ref_wraparound_enabled_flag) for i=0 . . . 1 together with other syntax elements (e.g., subpic_treated_as_pic_flag), as indicated below.

If subpic_treated_as_pic_flag[SubPicIdx] is equal to 1, the following applies:

```
xInt_i = Clip3( SubPicLeftBoundaryPos, SubPicRightBoundaryPos,
    subPic_ref_wraparound_enabled_flag ?
```

```
    ClipH( ( subpic_ref_wraparound_offset_minus1 + 1 ) *
        MinCbSizeY, SubPicWidth, ( xInt_L + i ) ) : xInt_L + i )
    yInt_i = Clip3( SubPicTopBoundaryPos, SubPicBotBoundaryPos,
        yInt_L + i )
```

When performing luma sample interpolation filtering (e.g., when determining the luma locations in full-sample units (xInt$_i$, yInt$_i$), the video processing apparatus may consider a sub-picture wrap-around motion compensation indicator (e.g., subpic_ref_wraparound_enabled_flag) for i=0 . . . 7 together with other syntax elements (e.g., subpic_treated_as_pic_flag), as indicated below.

If subpic_treated_as_pic_flag[SubPicIdx] is equal to 1, the following applies:

```
xInt_i = Clip3( SubPicLeftBoundaryPos, SubPicRightBoundaryPos,
    subPic_ref_wraparound_enabled_flag ?
        ClipH( ( subpic_ref_wraparound_offset_minus1 + 1) *
        MinCbSizeY, SubPicWidth, xInt_L + i − 3 ) : xInt_L + i − 3 )
    yInt_i = Clip3( SubPicTopBoundaryPos, SubPicBotBoundaryPos,
        yInt_L + i − 3 )
```

When performing chroma sample interpolation filtering (e.g., when determining the chroma locations in full-sample units (xInt$_i$, yInt$_i$), the video processing apparatus may consider a sub-picture wrap-around motion compensation indicator (e.g., subpic_ref_wraparound_enabled_flag) for i=0 . . . 3 together with other syntax elements (e.g., subpic_treated_as_pic_flag), as indicated below.

If subpic_treated_as_pic_flag[SubPicIdx] is equal to 1, the following applies:

```
xInt_i = Clip3( SubPicLeftBoundaryPos / SubWidthC,
    SubPicRightBoundaryPos / SubWidthC,
    subpic_ref_wraparound_enabled_flag ? ClipH( xOffset,
    SubPicWidthC, xIntC + i ) : xInt_L + i )
yInt_i = Clip3( SubPicTopBoundaryPos / SubHeightC,
    SubPicBotBoundaryPos / SubHeightC, yInt_L + i )
```

Figure 8:
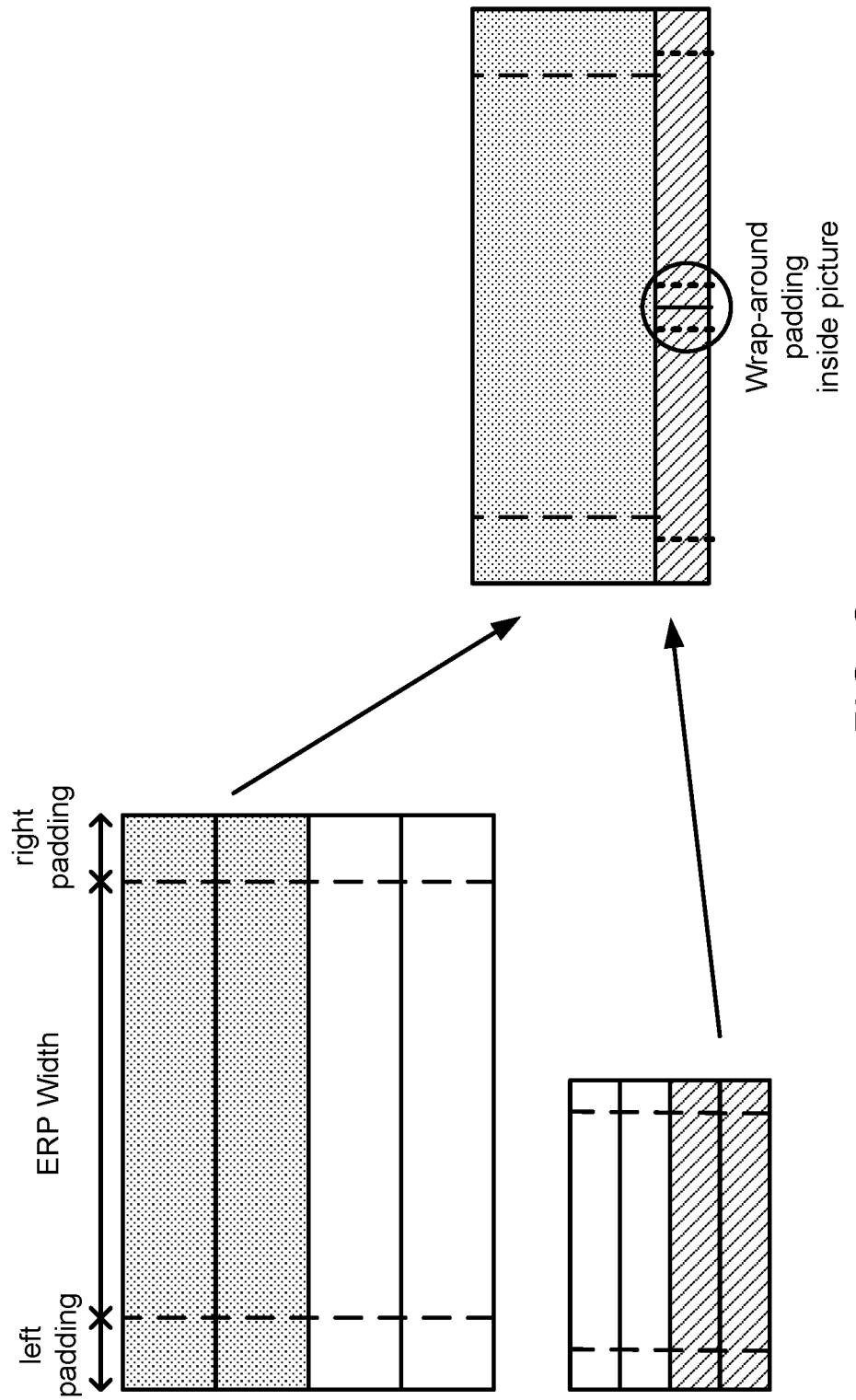
FIG. 8 is a diagram illustrating an example of sub-picture wrap-around padding inside a picture.

In examples (e.g., when a sub-picture boundary does not align with a corresponding picture boundary), a hardware (HW) decoder may not perform wrap-around padding. FIG. 8 shows an example of sub-picture wrap-around padding. In the circled area, wrap-around padding may be performed inside the picture. In some implementations (e.g., when multiple decoders are used), each sub-picture boundary may be treated the same as a corresponding picture boundary. In some implementations (e.g., when a single decoder is used), picture boundary may not be applied to a sub-picture boundary inside the picture.

Picture level wraparound motion prediction may improve the coding efficiency for certain type of contents such as 360-degree videos that may be delivered via viewport dependent streaming. Picture level wrap-around motion prediction may be disabled for sub-picture-based viewport dependent streaming, for example, if sub-picture level wrap-around motion prediction is not supported. Picture level wrap-around motion prediction may be enabled for sub-picture-based viewport dependent streaming, for example, if sub-picture level wrap-around motion prediction is supported.

Figure 9:
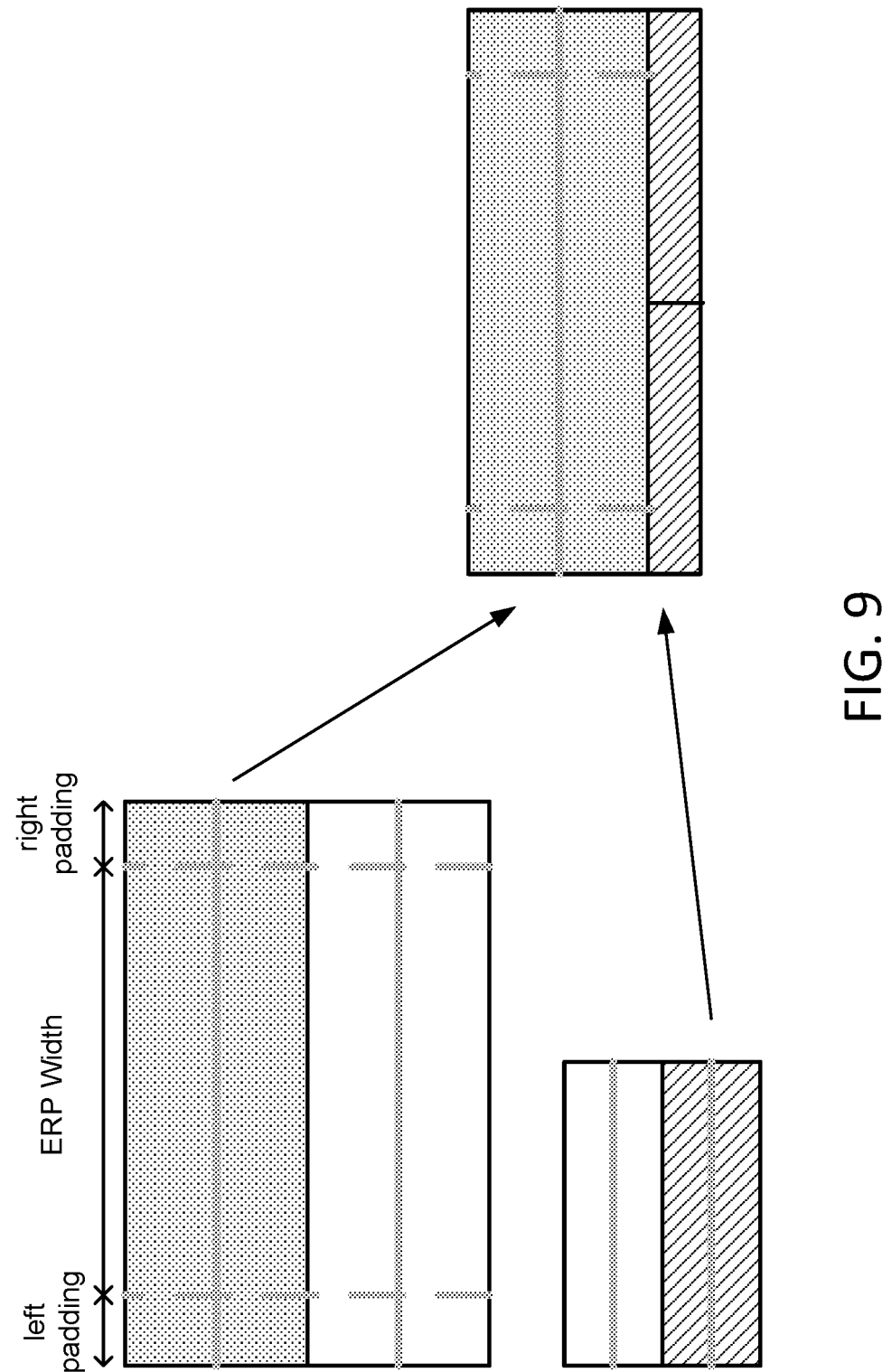
FIG. 9 is a diagram illustrating an example of sub-picture wrap-around padding.

Sub-picture level wrap-around motion prediction may be enabled if a sub-picture boundary aligns with a picture boundary. FIG. 9 illustrates when a sub-picture may be wrap-around padded and when a sub-picture may not be wrap-around padded. As shown, the top two sub-pictures on the left of FIG. 9 may be wrap-around padded since the left and right boundaries of those sub-pictures align with the boundary of the composed picture on the right of FIG. 9. In contrast, the bottom two sub-pictures on the left of FIG. 9 may not be wrap-around padded since one or more vertical boundaries (e.g., both the left and right vertical boundaries) of those sub-pictures do not align with the boundary of the composed picture. Table 7 below shows example syntax associated with wrap-around motion prediction that may support the example in FIG. 9.

TABLE 7

Example syntax elements associated with wrap-around padding

| | Descriptor |
|---|---|
| seq_parameter_set_rbsp( ) { | |
| ... | \ |
| subpics_present_flag | u(1) |
| if( subpics_present_flag ) { | |
|   max_subpics_minus1 | u(8) |
|   subpic_grid_col_width_minus1 | u(v) |
|   subpic_grid_row_height_minus1 | u(v) |
|   for( i = 0; i < NumSubPicGridRows; i++ ) | |
|     for(j = 0; j <NumSubPicGridCols; j++ ) | |
|       subpic_grid_idx[ i ][ j ] | u(v) |
|   for( i = 0; i <= NumSubPics; i++ ) { | |
|     subpic_treated_as_pic_flag[ i ] | u(1) |
|     loop_filter_across_subpic_enabled_flag[ i ] | u(1) |
|   } | |
| } | |
| ... | |
| sps_ref_wraparound_enabled_flag | u(1) |
| if( sps_ref_wraparound_enabled_flag ) { | |
|   sps_subpic_wraparound_enabled_flag | u(1) |
|   if (!sps_subpic_wraparound_enabled_flag) | |
|     sps_ref_wraparound_offset_minus1 | ue(v) |
|   else { | |
|     num_wraparound_boundaries_minus1 | ue(v) |
|     for (i = 0; i <= num_wraparound_boundaries_minus1; i++) | |
|     { | |
|       sps_subpic_wraparound_boundaries_pos_y0[ i ] | ue(v) |
|       sps_subpic_wraparound_boundaries_pos_y1[ i ] | ue(v) |
|       sps_subpic_wraparound_offset_minus1[ i ] | |
|     } | |
|   } | |
| } | |
| ... | |
| rbsp_trailing_bits( ) | |
| } | |

As shown, the example syntax in Table 7 may include an element such as an indicator sps_subpic_wraparound_enabled_flag that, when set to 1 or true, may indicate that one or more sub-picture wrap-around syntax elements such as sps_subpic_wraparound_boundaries_pos_y0[i], sps_subpic_wraparound_boundaries_pos_y1[i], and/or sps_subpic_wraparound_offset_minus1[i] are present in the SPS. When the indicator element sps_subpic_wraparound_enabled_flag is set to false or zero, it may indicate that a picture wrap-around offset indication such as sps_ref_wraparound_offset_minus1 is present in the SPS.

The example syntax in Table 7 may include an element num_wraparound_boundaries_minus1 that may specify the total number of boundary segments for which wrap-around padding may be performed. One or more elements (e.g., the combination of sps_subpic_wraparound_boundaries_pos_y0[i]) and sps_subpic_wraparound_boundaries_pos_y1 [i]) in the example syntax may specify the location of the i-th boundary segment (e.g., in units of luma samples or CTs).

The example syntax may also include an element, sps_subpic_wraparound_offset_minus1[i], that specifies the offset value to be applied to the i-th boundary segment.

A video processing apparatus as describe herein may be configured to send or receive (e.g., via a video bitstream) sub-picture positions, sub-picture sizes and/or sub-picture IDs. The sub-picture positions, sub-picture sizes and/or sub-picture IDs may be signaled based on a sub-picture grid, which may have a size (e.g., a minimum grid element size) of 4×4. The bit count associated with the signaling may be dependent on the number of the sub-pictures in the sub-picture grid. For instance, for a 4K×2K picture, the signaling bit count may be 47 bits for 6 sub-pictures, 149 bits for 24 sub-pictures, and 701 bits for 96 sub-pictures. The bit count may be reduced, for example, when the sub-pictures of a sub-picture grid share the same size (e.g., such as in cube-map projection (CMP)) and the sub-picture IDs are derived from the sub-picture grid without explicitly signaling the ID of each sub-picture.

Figure 10:
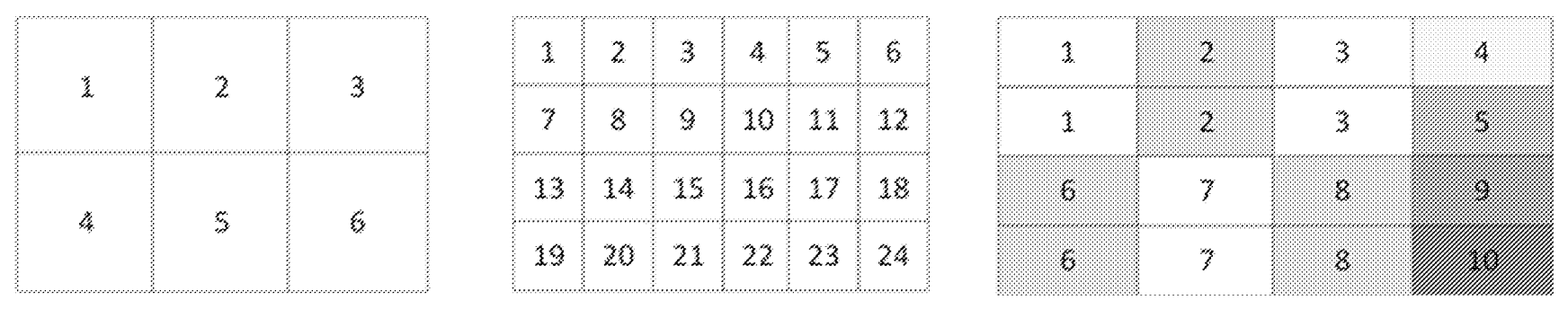

FIG. 10 shows three example sub-picture grids. The first grid comprises 6 sub-pictures, the second grid comprises 24 sub-pictures, and the third grid comprises 10 sub-pictures. Each of the first and second grids may include sub-pictures of identical sub-picture sizes, and the third grid may comprise 10 sub-pictures of different sub-picture sizes (e.g., as indicated by the different shading shown in FIG. 10). A syntax element (e.g., an SPS syntax element) such as single_subpic_per_grid_flag may be used to condition the signaling of subpic_grid_idx[i][j] (e.g., to indicate whether the signaling of subpic_grid_idx[i][j] is skipped), as shown in Table 8 below. Setting the value subpic_per_grid_flag to 1 (or another suitable value) may indicate that subpic_grid_idx[i][j] is not present in SPS RBSP syntax, and setting the value single_subpic_per_grid_flag to 0 (or another suitable value) may indicate that subpic_grid_idx[i][j] is present in SPS RBSP syntax. When the element single_subpic_per_grid_flag is not present, its value (e.g., the value of single_subpic_per_grid_flag) may be inferred to be equal to 1 (or another suitable value indicating that subpic_grid_idx[i][j] is not present in SPS RBSP syntax).

TABLE 8

Example SPS syntax including a signaling indicator

| | Descriptor |
|---|---|
| seq_parameter_set_rbsp( ) { | |
| ... | |
| subpics_present_flag | u(1) |
| if( subpics_present_flag ) { | |
|   max_subpics_minus1 | u(8) |
|   subpic_grid_col_width_minus1 | u(v) |
|   subpic_grid_row_height_minus1 | u(v) |
|   single_subpic_per_grid_flag | u(1) |
|   if ( !single_subpic_per_grid_flag ) | |
|     for( i = 0; i < NumSubPicGridRows; i++ ) | |
|       for( j = 0; j < NumSubPicGridCols; j++ ) | |
|         subpic_grid_idx[ i ][ j ] | u(v) |
|   for( i = 0; i <= NumSubPics; i++ ) { | |
|     subpic_treated_as_pic_flag[ i ] | u(1) |
|     loop_filter_across_subpic_enabled_flag[ i ] | u(1) |
|   } | |
| } | |
| ... | |
| } | |

Using the example syntax shown in Table 8, when single_subpic_per_grid_flag is equal to 1 (or another suitable value indicating that subpic_grid_idx[i][j] is not signaled), subpic_grid_idx[i][j] may be derived as follows:

```
for( i = 0; i < NumSubPicGridRows; i++ )
    for( j = 0; j < NumSubPicGridCols; j++ )
        subpic_grid_idx[ i ][ j ] = i * NumSubPicGridRows +
        NumSubPicGridCols
```

The value of subpic_grid_idx may be in the range of 0 to max_subpics_minus1, inclusive. By conditioning sub-picture signaling in the manner described herein, the bit counts associated with the signaling may be reduced, for example, to 30 bits for 6, 24 and 96 sub-pictures.

Sub-picture IDs may be signaled using a syntax element such as the subpic_grid_idx described herein. A minimum sub-picture grid size may be 4×4. A sub-picture may correspond to a rectangular region of one or more slices within a picture, and a slice may comprise a number of complete tiles or a sequence (e.g., a consecutive sequence) of complete bricks of one tile. Slice positions and/or sizes may be signaled, for example, in the PPS. A slice ID may be used to indicate a sub-picture position and/or sub-picture size to improve signaling efficiency.

A slice ID and/or slice_address may be signaled in a slice header. A slice_address may be equal to a slice ID set (e.g., explicitly set) in the PPS or to the slice index of a rectangular slice or to a brick ID for a raster scan slice. In examples (e.g., for rectangular slices), a slice position may be determined by a syntax element (e.g., a parameter) such as bottom_right_brick_idx (e.g., bottom_right_brick_idx may be used to derive TopLeftBrickIdx and/or Bottom RightBrickIdx). Raster scan slices may be used at least in low-delay scenarios. A sub-picture may be constrained to comprise one or more rectangular slices (e.g., comprise only rectangular slices) and such a constrained sub-picture may be signaled based on the slices comprised in the sub-picture, for example, to facilitate slice extraction. Table 9 below shows example syntax for sub-picture signaling.

TABLE 9

Example sub-picture syntax

| | Descriptor |
|---|---|
| pic_parameter_set_rbsp( ) { | |
| ... | |
| subpics_present_flag | u(1) |
| if( subpics_present_flag ) { | |
| subpic_per_slice_flag | u(1) |
| if (!subpic_per_slice_flag) { | |
| max_subpics_minus1 | u(8) |
| for( i = 0; i <= max_subpics_minus1; i++ ) { | |
| num_slices_minus1[ i ] | |
| for( j = 0; j <= num_slices_minus1[ i ]; j++ ) | |
| slice_address[ i ][ j ] | u(v) |
| } | |
| } | |
| } | |
| } | |
| ... | |

As shown in the table, the example sub-picture signaling syntax may include a first element, subpic_per_slice_flag, that may be used to indicate whether a (e.g. each) slice is a sub-picture (e.g., when subpic_per_slice_flag is set to 1) or whether the slice comprises one or more slices (e.g., when subpic_per_slice_flag is set to 0). The example syntax may include a second element, num_slices_minus1[i] plus 1, that specifies the total number of slices within the i-th sub-picture, and a third element, slice_address[i][j], that specifies the address of the j-th slice of the i-th sub-picture. In examples (e.g., when an element such as signaled_sli-ce_id_flag is signaled in the PPS and set to a value of 1), the value of slice address[i][j] may be equal to the slice ID of the slice, and the value of slice_address[i][j] may be in the range of 0 to $2^{(signalled\_slice\_id\_length\_minus1+1)}-1$, inclusive. In examples (e.g., when signaled_slice_id_flag is set to 0), the value of slice_address[i][j] may be in the range of 0 to num_slices_in_pic_minus1, inclusive.

Figure 11:
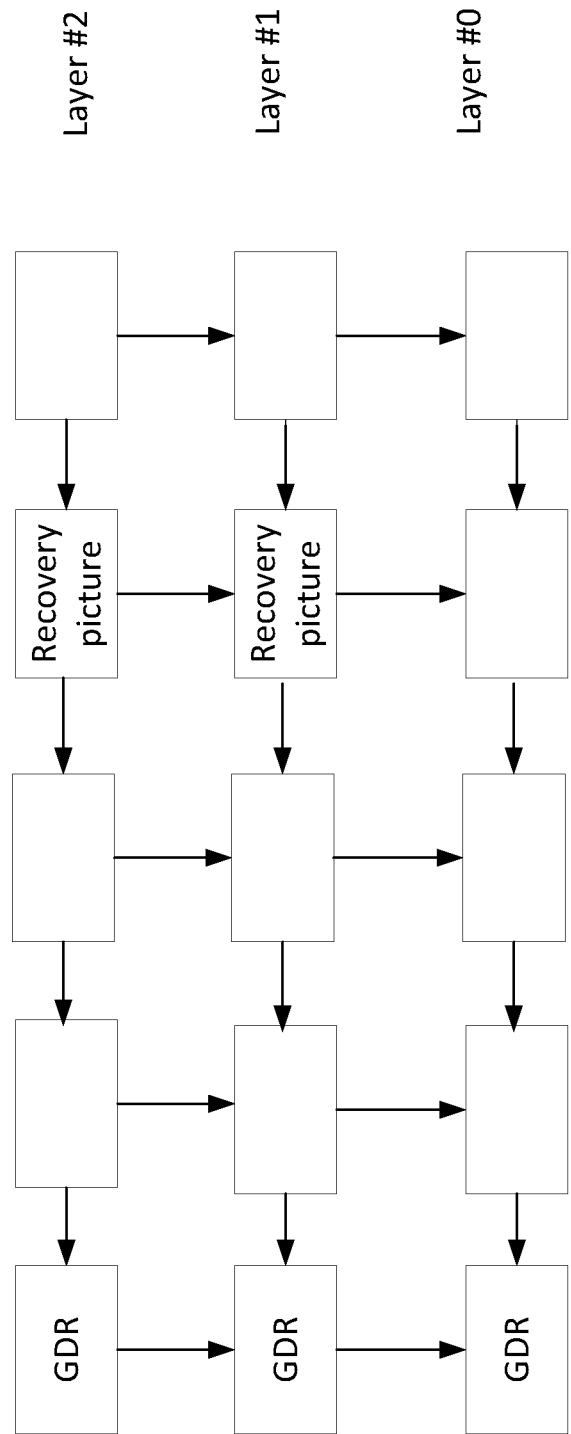
FIG. 11 is a diagram illustrating an example of a layer-based gradual decoding refresh (GDR) picture.

A syntax element such as recovery_poc_cnt may be signaled in the slice header of a Gradual Decoding Refresh (GDR) NAL unit. Such an element may specify the recovery point of a decoded picture in an output order. A picture may be referred to as a recovery point picture when it follows the current GDR picture in the decoding order and its POC value is equal to the POC value of GDR plus the value of recovery_poc_cnt. FIG. 11 shows an example of a layer-based coding structure. A layer picture may refer to a GDR picture from its dependent layer. A constraint may be imposed to mandate that the NAL unit type (NUT) of a layer picture whose inter-layer reference picture is a GDR picture be set to GDR_NUT (e.g., a NAL unit type for GDR picture) and/or that the value of recovery_poc_cnt of a current slice be the same as the value of recovery_poc_cnt of the corresponding inter-layer reference picture.

Figure 12A:
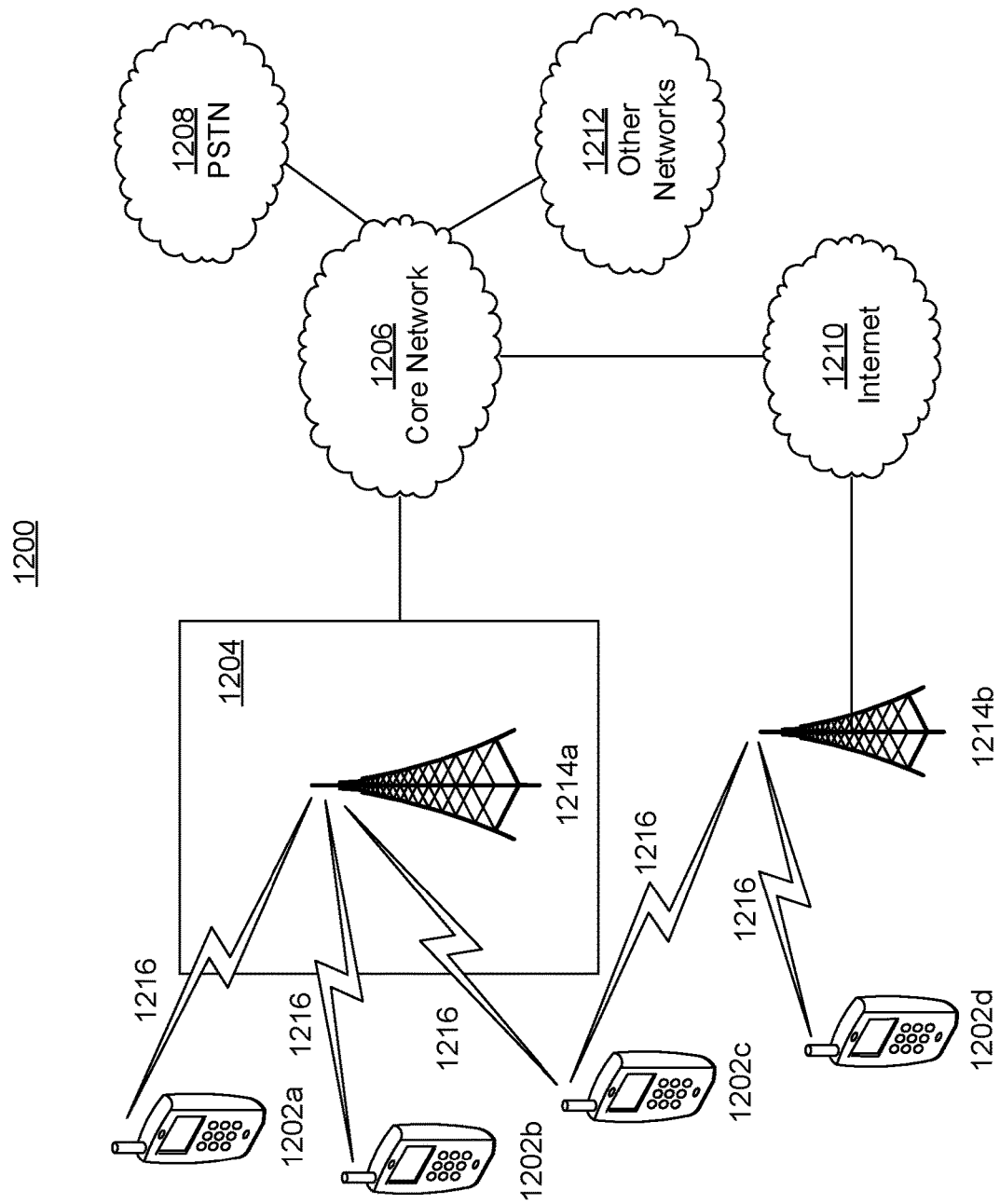
FIG. 12A is a system diagram illustrating an example communications system in which one or more disclosed embodiments may be implemented.

FIG. 12A is a diagram illustrating an example communications system 1200 in which one or more disclosed embodiments may be implemented. The communications system 1200 may be a multiple access system that provides content, such as voice, data, video, messaging, broadcast, etc., to multiple wireless users. The communications system 1200 may enable multiple wireless users to access such content through the sharing of system resources, including wireless bandwidth. For example, the communications systems 1200 may employ one or more channel access methods, such as code division multiple access (CDMA), time division multiple access (TDMA), frequency division multiple access (FDMA), orthogonal FDMA (OFDMA), single-carrier FDMA (SC-FDMA), zero-tail unique-word DFT-Spread OFDM (ZT UW DTS-s OFDM), unique word OFDM (UW-OFDM), resource block-filtered OFDM, filter bank multicarrier (FBMC), and the like.

As shown in FIG. 12A, the communications system 1200 may include wireless transmit/receive units (WTRUs) 1202a, 1202b, 1202c, 1202d, a RAN 1204/1213, a CN 1206/1215, a public switched telephone network (PSTN) 1208, the Internet 1210, and other networks 1212, though it will be appreciated that the disclosed embodiments contemplate any number of WTRUs, base stations, networks, and/or network elements. Each of the WTRUs 1202a, 1202b, 1202c, 1202d may be any type of device configured to operate and/or communicate in a wireless environment. By way of example, the WTRUs 1202a, 1202b, 1202c, 1202d, any of which may be referred to as a "station" and/or a "STA", may be configured to transmit and/or receive wireless signals and may include a user equipment (UE), a mobile station, a fixed or mobile subscriber unit, a subscription-based unit, a pager, a cellular telephone, a personal digital assistant (PDA), a smartphone, a laptop, a netbook, a personal computer, a wireless sensor, a hotspot or Mi-Fi device, an Internet of Things (IoT) device, a watch or other wearable, a head-mounted display (HMD), a vehicle, a drone, a medical device and applications (e.g. remote surgery), an industrial device and applications (e.g. a robot and/or other wireless devices operating in an industrial and/or an automated processing chain contexts), a consumer electronics device, a device operating on commercial and/or industrial wireless networks, and the like. Any of the WTRUs 1202*a*, 1202*b*, 1202*c* and 1202*d* may be interchangeably referred to as a UE.

The communications systems 1200 may also include a base station 1214*a* and/or a base station 1214*b*. Each of the base stations 1214*a*, 1214*b* may be any type of device configured to wirelessly interface with at least one of the WTRUs 1202*a*, 1202*b*, 1202*c*, 1202*d* to facilitate access to one or more communication networks, such as the CN 1206/1215, the Internet 1210, and/or the other networks 1212. By way of example, the base stations 1214*a*, 1214*b* may be a base transceiver station (BTS), a Node-B, an eNode B, a Home Node B, a Home eNode B, a gNB, a NR NodeB, a site controller, an access point (AP), a wireless router, and the like. While the base stations 1214*a*, 1214*b* are each depicted as a single element, it will be appreciated that the base stations 1214*a*, 1214*b* may include any number of interconnected base stations and/or network elements.

The base station 1214*a* may be part of the RAN 1204/1213, which may also include other base stations and/or network elements (not shown), such as a base station controller (BSC), a radio network controller (RNC), relay nodes, etc. The base station 1214*a* and/or the base station 1214*b* may be configured to transmit and/or receive wireless signals on one or more carrier frequencies, which may be referred to as a cell (not shown). These frequencies may be in licensed spectrum, unlicensed spectrum, or a combination of licensed and unlicensed spectrum. A cell may provide coverage for a wireless service to a specific geographical area that may be relatively fixed or that may change over time. The cell may further be divided into cell sectors. For example, the cell associated with the base station 1214*a* may be divided into three sectors. Thus, in one embodiment, the base station 1214*a* may include three transceivers, i.e., one for each sector of the cell. In an embodiment, the base station 1214*a* may employ multiple-input multiple output (MIMO) technology and may utilize multiple transceivers for each sector of the cell. For example, beamforming may be used to transmit and/or receive signals in desired spatial directions.

The base stations 1214*a*, 1214*b* may communicate with one or more of the WTRUs 1202*a*, 1202*b*, 1202*c*, 1202*d* over an air interface 1216, which may be any suitable wireless communication link (e.g. radio frequency (RF), microwave, centimeter wave, micrometer wave, infrared (IR), ultraviolet (UV), visible light, etc.). The air interface 1216 may be established using any suitable radio access technology (RAT).

More specifically, as noted above, the communications system 1200 may be a multiple access system and may employ one or more channel access schemes, such as CDMA, TDMA, FDMA, OFDMA, SC-FDMA, and the like. For example, the base station 1214*a* in the RAN 1204/1213 and the WTRUs 1202*a*, 1202*b*, 1202*c* may implement a radio technology such as Universal Mobile Telecommunications System (UMTS) Terrestrial Radio Access (UTRA), which may establish the air interface 1215/1216/1217 using wideband CDMA (WCDMA). WCDMA may include communication protocols such as High-Speed Packet Access (HSPA) and/or Evolved HSPA (HSPA+). HSPA may include High-Speed Downlink (DL) Packet Access (HSDPA) and/or High-Speed UL Packet Access (HSUPA).

In an embodiment, the base station 1214*a* and the WTRUs 1202*a*, 1202*b*, 1202*c* may implement a radio technology such as Evolved UMTS Terrestrial Radio Access (E-UTRA), which may establish the air interface 1216 using Long Term Evolution (LTE) and/or LTE-Advanced (LTE-A) and/or LTE-Advanced Pro (LTE-A Pro).

In an embodiment, the base station 1214*a* and the WTRUs 1202*a*, 1202*b*, 1202*c* may implement a radio technology such as NR Radio Access, which may establish the air interface 1216 using New Radio (NR).

In an embodiment, the base station 1214*a* and the WTRUs 1202*a*, 1202*b*, 1202*c* may implement multiple radio access technologies. For example, the base station 1214*a* and the WTRUs 1202*a*, 1202*b*, 1202*c* may implement LTE radio access and NR radio access together, for instance using dual connectivity (DC) principles. Thus, the air interface utilized by WTRUs 1202*a*, 1202*b*, 1202*c* may be characterized by multiple types of radio access technologies and/or transmissions sent to/from multiple types of base stations (e.g. an eNB and a gNB).

In other embodiments, the base station 1214*a* and the WTRUs 1202*a*, 1202*b*, 1202*c* may implement radio technologies such as IEEE 802.11 (i.e., Wireless Fidelity (WiFi), IEEE 802.16 (i.e., Worldwide Interoperability for Microwave Access (WiMAX)), CDMA2000, CDMA2000 1×, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 1214*b* in FIG. 12A may be a wireless router, Home Node B, Home eNode B, or access point, for example, and may utilize any suitable RAT for facilitating wireless connectivity in a localized area, such as a place of business, a home, a vehicle, a campus, an industrial facility, an air corridor (e.g. for use by drones), a roadway, and the like. In one embodiment, the base station 1214*b* and the WTRUs 1202*c*, 1202*d* may implement a radio technology such as IEEE 802.11 to establish a wireless local area network (WLAN). In an embodiment, the base station 1214*b* and the WTRUs 1202*c*, 1202*d* may implement a radio technology such as IEEE 802.15 to establish a wireless personal area network (WPAN). In yet another embodiment, the base station 1214*b* and the WTRUs 1202*c*, 1202*d* may utilize a cellular-based RAT (e.g. WCDMA, CDMA2000, GSM, LTE, LTE-A, LTE-A Pro, NR etc.) to establish a picocell or femtocell. As shown in FIG. 12A, the base station 1214*b* may have a direct connection to the Internet 1210. Thus, the base station 1214*b* may not be required to access the Internet 1210 via the CN 1206/1215.

The RAN 1204/1213 may be in communication with the CN 1206/1215, which may be any type of network configured to provide voice, data, applications, and/or voice over internet protocol (VoIP) services to one or more of the WTRUs 1202*a*, 1202*b*, 1202*c*, 1202*d*. The data may have varying quality of service (QoS) requirements, such as differing throughput requirements, latency requirements, error tolerance requirements, reliability requirements, data throughput requirements, mobility requirements, and the like. The CN 1206/1215 may provide call control, billing services, mobile location-based services, pre-paid calling, Internet connectivity, video distribution, etc., and/or perform high-level security functions, such as user authentication. Although not shown in FIG. 12A, it will be appreciated that the RAN 1204/1213 and/or the CN 1206/1215 may be in direct or indirect communication with other RANs that employ the same RAT as the RAN 1204/1213 or a different RAT. For example, in addition to being connected to the RAN 1204/1213, which may be utilizing a NR radio technology, the CN 1206/1215 may also be in communication with another RAN (not shown) employing a GSM, UMTS, CDMA 2000, WiMAX, E-UTRA, or WiFi radio technology.

The CN 1206/1215 may also serve as a gateway for the WTRUs 1202*a*, 1202*b*, 1202*c*, 1202*d* to access the PSTN 1208, the Internet 1210, and/or the other networks 1212. The PSTN 1208 may include circuit-switched telephone networks that provide plain old telephone service (POTS). The Internet 1210 may include a global system of interconnected computer networks and devices that use common communication protocols, such as the transmission control protocol (TCP), user datagram protocol (UDP) and/or the internet protocol (IP) in the TCP/IP internet protocol suite. The networks 1212 may include wired and/or wireless communications networks owned and/or operated by other service providers. For example, the networks 1212 may include another CN connected to one or more RANs, which may employ the same RAT as the RAN 1204/1213 or a different RAT.

Some or all of the WTRUs 1202*a*, 1202*b*, 1202*c*, 1202*d* in the communications system 100 may include multi-mode capabilities (e.g. the WTRUs 1202*a*, 1202*b*, 1202*c*, 1202*d* may include multiple transceivers for communicating with different wireless networks over different wireless links). For example, the WTRU 1202*c* shown in FIG. 12A may be configured to communicate with the base station 1214*a*, which may employ a cellular-based radio technology, and with the base station 1214*b*, which may employ an IEEE 802 radio technology.

Figure 12B:
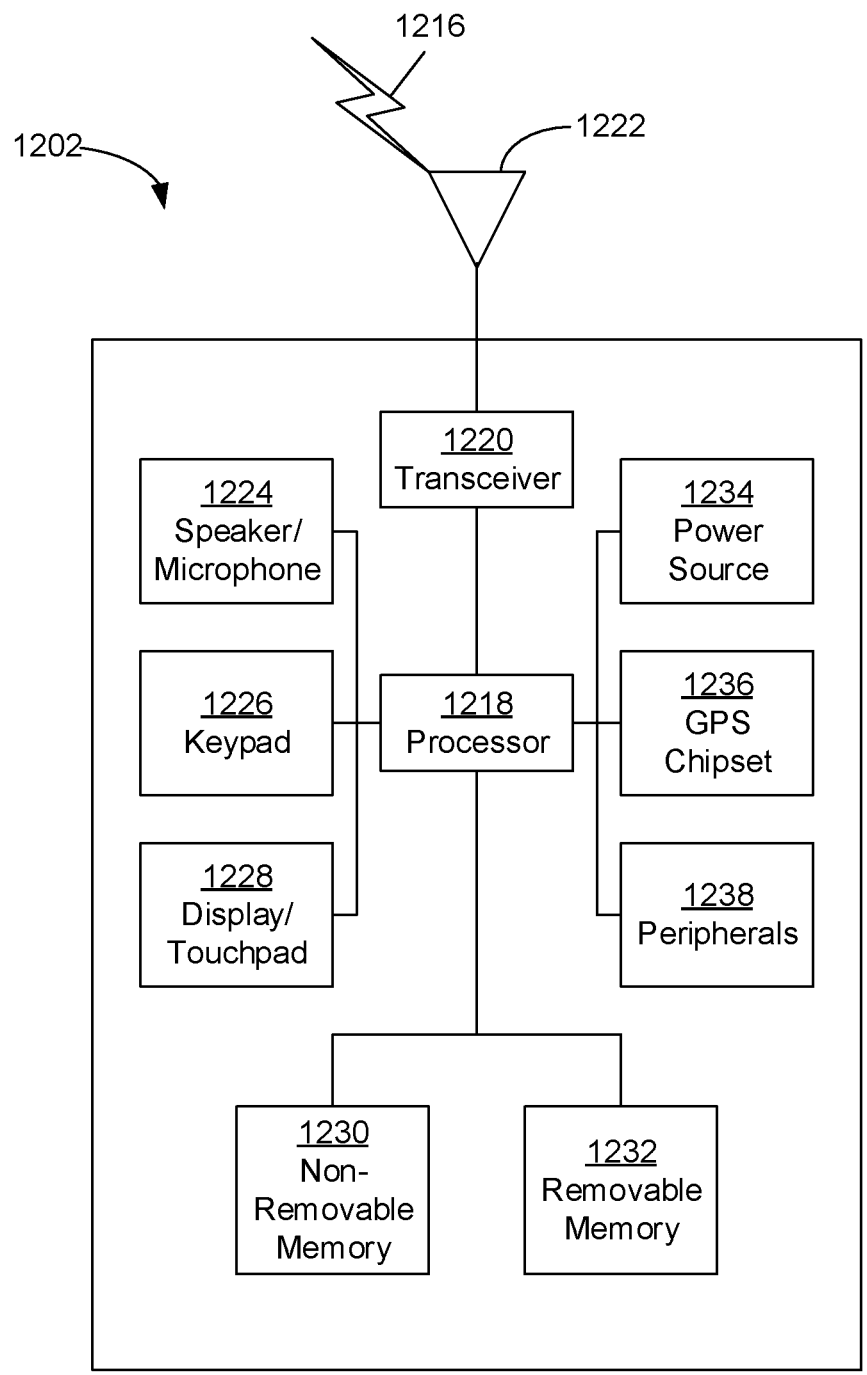
FIG. 12B is a system diagram illustrating an example wireless transmit/receive unit (WTRU) that may be used within the communications system illustrated in FIG. 12A according to an embodiment.

FIG. 12B is a system diagram illustrating an example WTRU 1202. As shown in FIG. 12B, the WTRU 1202 may include a processor 1218, a transceiver 1220, a transmit/receive element 1222, a speaker/microphone 1224, a keypad 1226, a display/touchpad 1228, non-removable memory 1230, removable memory 1232, a power source 1234, a global positioning system (GPS) chipset 1236, and/or other peripherals 1238, among others. It will be appreciated that the WTRU 1202 may include any sub-combination of the foregoing elements while remaining consistent with an embodiment.

The processor 1218 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), a state machine, and the like. The processor 1218 may perform signal coding, data processing, power control, input/output processing, and/or any other functionality that enables the WTRU 1202 to operate in a wireless environment. The processor 1218 may be coupled to the transceiver 1220, which may be coupled to the transmit/receive element 1222. While FIG. 12B depicts the processor 1218 and the transceiver 1220 as separate components, it will be appreciated that the processor 1218 and the transceiver 1220 may be integrated together in an electronic package or chip.

The transmit/receive element 1222 may be configured to transmit signals to, or receive signals from, a base station (e.g. the base station 1214*a*) over the air interface 1216. For example, in one embodiment, the transmit/receive element 1222 may be an antenna configured to transmit and/or receive RF signals. In an embodiment, the transmit/receive element 1222 may be an emitter/detector configured to transmit and/or receive IR, UV, or visible light signals, for example. In yet another embodiment, the transmit/receive element 1222 may be configured to transmit and/or receive both RF and light signals. It will be appreciated that the transmit/receive element 1222 may be configured to transmit and/or receive any combination of wireless signals.

Although the transmit/receive element 1222 is depicted in FIG. 9B as a single element, the WTRU 1202 may include any number of transmit/receive elements 1222. More specifically, the WTRU 1202 may employ MIMO technology. Thus, in one embodiment, the WTRU 1202 may include two or more transmit/receive elements 1222 (e.g. multiple antennas) for transmitting and receiving wireless signals over the air interface 1216.

The transceiver 1220 may be configured to modulate the signals that are to be transmitted by the transmit/receive element 1222 and to demodulate the signals that are received by the transmit/receive element 1222. As noted above, the WTRU 1202 may have multi-mode capabilities. Thus, the transceiver 1220 may include multiple transceivers for enabling the WTRU 1202 to communicate via multiple RATs, such as NR and IEEE 802.11, for example.

The processor 1218 of the WTRU 1202 may be coupled to, and may receive user input data from, the speaker/microphone 1224, the keypad 1226, and/or the display/touchpad 1228 (e.g. a liquid crystal display (LCD) display unit or organic light-emitting diode (OLED) display unit). The processor 1218 may also output user data to the speaker/microphone 1224, the keypad 1226, and/or the display/touchpad 1228. In addition, the processor 1218 may access information from, and store data in, any type of suitable memory, such as the non-removable memory 1230 and/or the removable memory 1232. The non-removable memory 1230 may include random-access memory (RAM), read-only memory (ROM), a hard disk, or any other type of memory storage device. The removable memory 1232 may include a subscriber identity module (SIM) card, a memory stick, a secure digital (SD) memory card, and the like. In other embodiments, the processor 1218 may access information from, and store data in, memory that is not physically located on the WTRU 1202, such as on a server or a home computer (not shown).

The processor 1218 may receive power from the power source 1234, and may be configured to distribute and/or control the power to the other components in the WTRU 1202. The power source 1234 may be any suitable device for powering the WTRU 1202. For example, the power source 1234 may include one or more dry cell batteries (e.g. nickel-cadmium (NiCd), nickel-zinc (NiZn), nickel metal hydride (NiMH), lithium-ion (Li-ion), etc.), solar cells, fuel cells, and the like.

The processor 1218 may also be coupled to the GPS chipset 1236, which may be configured to provide location information (e.g. longitude and latitude) regarding the current location of the WTRU 1202. In addition to, or in lieu of, the information from the GPS chipset 1236, the WTRU 1202 may receive location information over the air interface 1216 from a base station (e.g. base stations 1214*a*, 1214*b*) and/or determine its location based on the timing of the signals being received from two or more nearby base stations. It will be appreciated that the WTRU 1202 may acquire location information by way of any suitable location-determination method while remaining consistent with an embodiment.

The processor 1218 may further be coupled to other peripherals 1238, which may include one or more software and/or hardware modules that provide additional features, functionality and/or wired or wireless connectivity. For example, the peripherals 1238 may include an accelerometer, an e-compass, a satellite transceiver, a digital camera (for photographs and/or video), a universal serial bus (USB) port, a vibration device, a television transceiver, a hands free headset, a Bluetooth® module, a frequency modulated (FM) radio unit, a digital music player, a media player, a video game player module, an Internet browser, a Virtual Reality and/or Augmented Reality (VR/AR) device, an activity tracker, and the like. The peripherals 1238 may include one or more sensors, the sensors may be one or more of a gyroscope, an accelerometer, a hall effect sensor, a magnetometer, an orientation sensor, a proximity sensor, a temperature sensor, a time sensor; a geolocation sensor; an altimeter, a light sensor, a touch sensor, a magnetometer, a barometer, a gesture sensor, a biometric sensor, and/or a humidity sensor The WTRU 1202 may include a full duplex radio for which transmission and reception of some or all of the signals (e.g. associated with particular subframes for both the UL (e.g. for transmission) and downlink (e.g. for reception) may be concurrent and/or simultaneous. The full duplex radio may include an interference management unit to reduce and or substantially eliminate self-interference via either hardware (e.g. a choke) or signal processing via a processor (e.g. a separate processor (not shown) or via processor 1218). In an embodiment, the WRTU 1202 may include a half-duplex radio for which transmission and reception of some or all of the signals (e.g. associated with particular subframes for either the UL (e.g. for transmission) or the downlink (e.g. for reception))

Figure 12C:
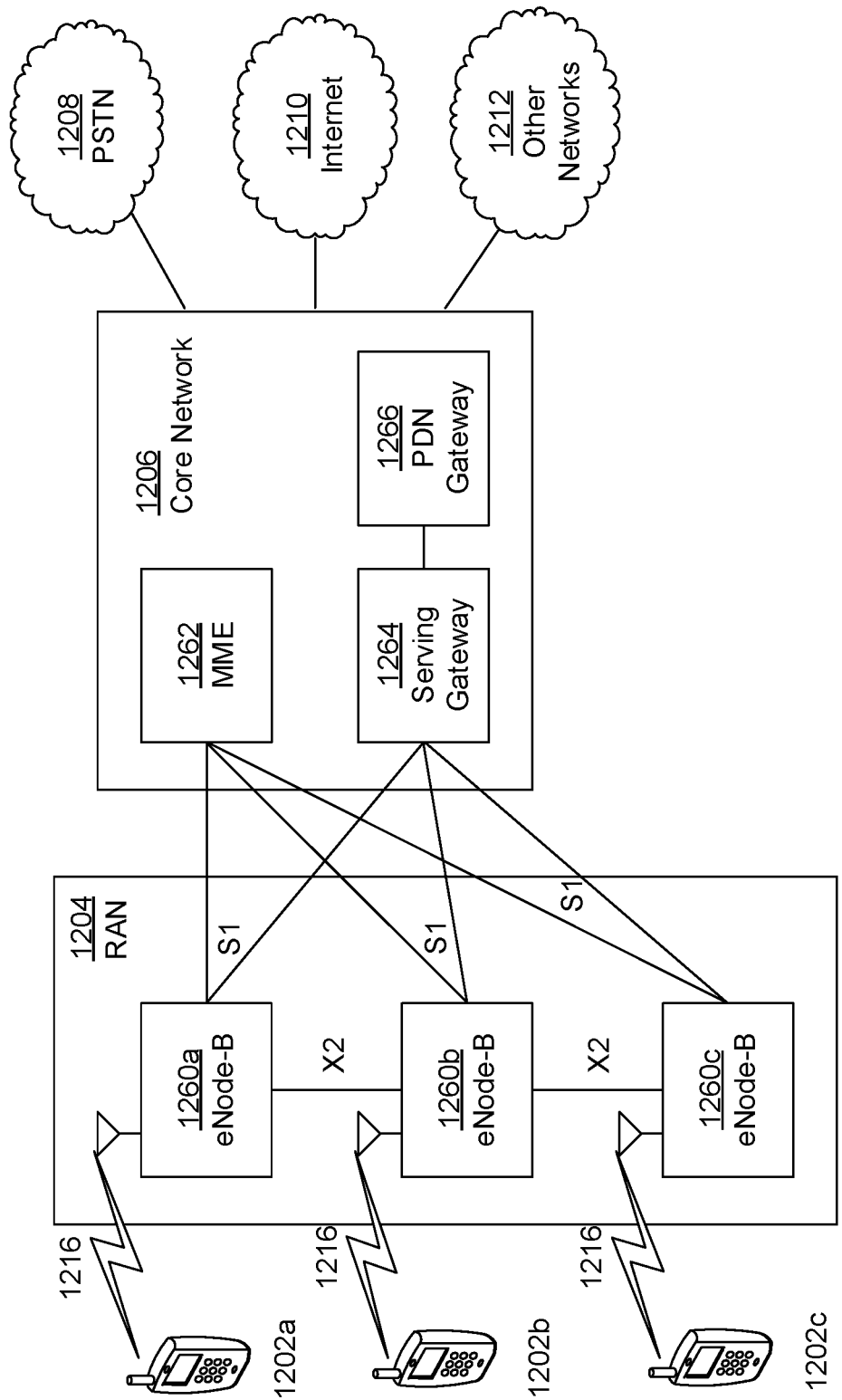
FIG. 12C is a system diagram illustrating an example radio access network (RAN) and an example core network (CN) that may be used within the communications system illustrated in FIG. 12A according to an embodiment.

FIG. 12C is a system diagram illustrating the RAN 1204 and the CN 1206 according to an embodiment. As noted above, the RAN 1204 may employ an E-UTRA radio technology to communicate with the WTRUs 1202a, 1202b, 1202c over the air interface 1216. The RAN 1204 may also be in communication with the CN 1206.

The RAN 1204 may include eNode-Bs 1260a, 1260b, 1260c, though it will be appreciated that the RAN 1204 may include any number of eNode-Bs while remaining consistent with an embodiment. The eNode-Bs 1260a, 1260b, 1260c may each include one or more transceivers for communicating with the WTRUs 1202a, 1202b, 1202c over the air interface 1216. In one embodiment, the eNode-Bs 1260a, 1260b, 1260c may implement MIMO technology. Thus, the eNode-B 1260a, for example, may use multiple antennas to transmit wireless signals to, and/or receive wireless signals from, the WTRU 1202a.

Each of the eNode-Bs 1260a, 1260b, 1260c may be associated with a particular cell (not shown) and may be configured to handle radio resource management decisions, handover decisions, scheduling of users in the UL and/or DL, and the like. As shown in FIG. 12C, the eNode-Bs 1260a, 1260b, 1260c may communicate with one another over an X2 interface.

The CN 1206 shown in FIG. 12C may include a mobility management entity (MME) 1262, a serving gateway (SGW) 1264, and a packet data network (PDN) gateway (or PGW) 1266. While each of the foregoing elements are depicted as part of the CN 1206, it will be appreciated that any of these elements may be owned and/or operated by an entity other than the CN operator.

The MME 1262 may be connected to each of the eNode-Bs 1260a, 1260b, 1260c in the RAN 1204 via an S1 interface and may serve as a control node. For example, the MME 1262 may be responsible for authenticating users of the WTRUs 1202a, 1202b, 1202c, bearer activation/deactivation, selecting a particular serving gateway during an initial attach of the WTRUs 1202a, 1202b, 1202c, and the like. The MME 1262 may provide a control plane function for switching between the RAN 1204 and other RANs (not shown) that employ other radio technologies, such as GSM and/or WCDMA.

The SGW 1264 may be connected to each of the eNode Bs 1260a, 1260b, 1260c in the RAN 1204 via the S1 interface. The SGW 1264 may generally route and forward user data packets to/from the WTRUs 1202a, 1202b, 1202c. The SGW 1264 may perform other functions, such as anchoring user planes during inter-eNode B handovers, triggering paging when DL data is available for the WTRUs 1202a, 1202b, 1202c, managing and storing contexts of the WTRUs 1202a, 1202b, 1202c, and the like.

The SGW 1264 may be connected to the PGW 1266, which may provide the WTRUs 1202a, 1202b, 1202c with access to packet-switched networks, such as the Internet 1210, to facilitate communications between the WTRUs 1202a, 1202b, 1202c and IP-enabled devices.

The CN 1206 may facilitate communications with other networks. For example, the CN 1206 may provide the WTRUs 1202a, 1202b, 1202c with access to circuit-switched networks, such as the PSTN 1208, to facilitate communications between the WTRUs 1202a, 1202b, 1202c and traditional land-line communications devices. For example, the CN 1206 may include, or may communicate with, an IP gateway (e.g. an IP multimedia subsystem (IMS) server) that serves as an interface between the CN 1206 and the PSTN 1208. In addition, the CN 1206 may provide the WTRUs 1202a, 1202b, 1202c with access to the other networks 1212, which may include other wired and/or wireless networks that are owned and/or operated by other service providers Although the WTRU is described in FIGS. 12A-12D as a wireless terminal, it is contemplated that in certain representative embodiments that such a terminal may use (e.g. temporarily or permanently) wired communication interfaces with the communication network.

In representative embodiments, the other network 1212 may be a WLAN.

A WLAN in Infrastructure Basic Service Set (BSS) mode may have an Access Point (AP) for the BSS and one or more stations (STAs) associated with the AP. The AP may have an access or an interface to a Distribution System (DS) or another type of wired/wireless network that carries traffic in to and/or out of the BSS. Traffic to STAs that originates from outside the BSS may arrive through the AP and may be delivered to the STAs. Traffic originating from STAs to destinations outside the BSS may be sent to the AP to be delivered to respective destinations. Traffic between STAs within the BSS may be sent through the AP, for example, where the source STA may send traffic to the AP and the AP may deliver the traffic to the destination STA. The traffic between STAs within a BSS may be considered and/or referred to as peer-to-peer traffic. The peer-to-peer traffic may be sent between (e.g. directly between) the source and destination STAs with a direct link setup (DLS). In certain representative embodiments, the DLS may use an 802.11e DLS or an 802.11z tunneled DLS (TDLS). A WLAN using an Independent BSS (IBSS) mode may not have an AP, and the STAs (e.g. all of the STAs) within or using the IBSS may communicate directly with each other. The IBSS mode of communication may sometimes be referred to herein as an "ad-hoc" mode of communication When using the 802.11ac infrastructure mode of operation or a similar mode of operations, the AP may transmit a beacon on a fixed channel, such as a primary channel. The primary channel may be a fixed width (e.g. 20 MHz wide bandwidth) or a dynamically set width via signaling. The primary channel may be the operating channel of the BSS and may be used by the STAs to establish a connection with the AP. In certain representative embodiments, Carrier Sense Multiple Access with Collision Avoidance (CSMA/CA) may be implemented, for example in in 802.11 systems. For CSMA/CA, the STAs (e.g. every STA), including the AP, may sense the primary channel. If the primary channel is sensed/detected and/or determined to be busy by a particular STA, the particular STA may back off. One STA (e.g. only one station) may transmit at any given time in a given BSS High Throughput (HT) STAs may use a 40 MHz wide channel for communication, for example, via a combination of the primary 20 MHz channel with an adjacent or nonadjacent 20 MHz channel to form a 40 MHz wide channel Very High Throughput (VHT) STAs may support 20 MHz, 40 MHz, 80 MHz, and/or 160 MHz wide channels. The 40 MHz, and/or 80 MHz, channels may be formed by combining contiguous 20 MHz channels. A 160 MHz channel may be formed by combining 8 contiguous 20 MHz channels, or by combining two non-contiguous 80 MHz channels, which may be referred to as an 80+80 configuration. For the 80+80 configuration, the data, after channel encoding, may be passed through a segment parser that may divide the data into two streams. Inverse Fast Fourier Transform (IFFT) processing, and time domain processing, may be done on each stream separately. The streams may be mapped on to the two 80 MHz channels, and the data may be transmitted by a transmitting STA. At the receiver of the receiving STA, the above described operation for the 80+80 configuration may be reversed, and the combined data may be sent to the Medium Access Control (MAC)

Sub 1 GHz modes of operation are supported by 802.11af and 802.11ah. The channel operating bandwidths, and carriers, are reduced in 802.11af and 802.11ah relative to those used in 802.11n, and 802.11ac. 802.11af supports 5 MHz, 10 MHz and 20 MHz bandwidths in the TV White Space (TVWS) spectrum, and 802.11ah supports 1 MHz, 2 MHz, 4 MHz, 8 MHz, and 16 MHz bandwidths using non-TVWS spectrum. According to a representative embodiment, 802.11ah may support Meter Type Control/Machine-Type Communications, such as MTC devices in a macro coverage area. MTC devices may have certain capabilities, for example, limited capabilities including support for (e.g. only support for) certain and/or limited bandwidths. The MTC devices may include a battery with a battery life above a threshold (e.g. to maintain a very long battery life)

WLAN systems, which may support multiple channels, and channel bandwidths, such as 802.11n, 802.11ac, 802.11af, and 802.11ah, include a channel which may be designated as the primary channel. The primary channel may have a bandwidth equal to the largest common operating bandwidth supported by all STAs in the BSS. The bandwidth of the primary channel may be set and/or limited by a STA, from among all STAs in operating in a BSS, which supports the smallest bandwidth operating mode. In the example of 802.11ah, the primary channel may be 1 MHz wide for STAs (e.g. MTC type devices) that support (e.g. only support) a 1 MHz mode, even if the AP, and other STAs in the BSS support 2 MHz, 4 MHz, 8 MHz, 16 MHz, and/or other channel bandwidth operating modes. Carrier sensing and/or Network Allocation Vector (NAV) settings may depend on the status of the primary channel. If the primary channel is busy, for example, due to a STA (which supports only a 1 MHz operating mode), transmitting to the AP, the entire available frequency bands may be considered busy even though a majority of the frequency bands remains idle and may be available.

Figure 12D:
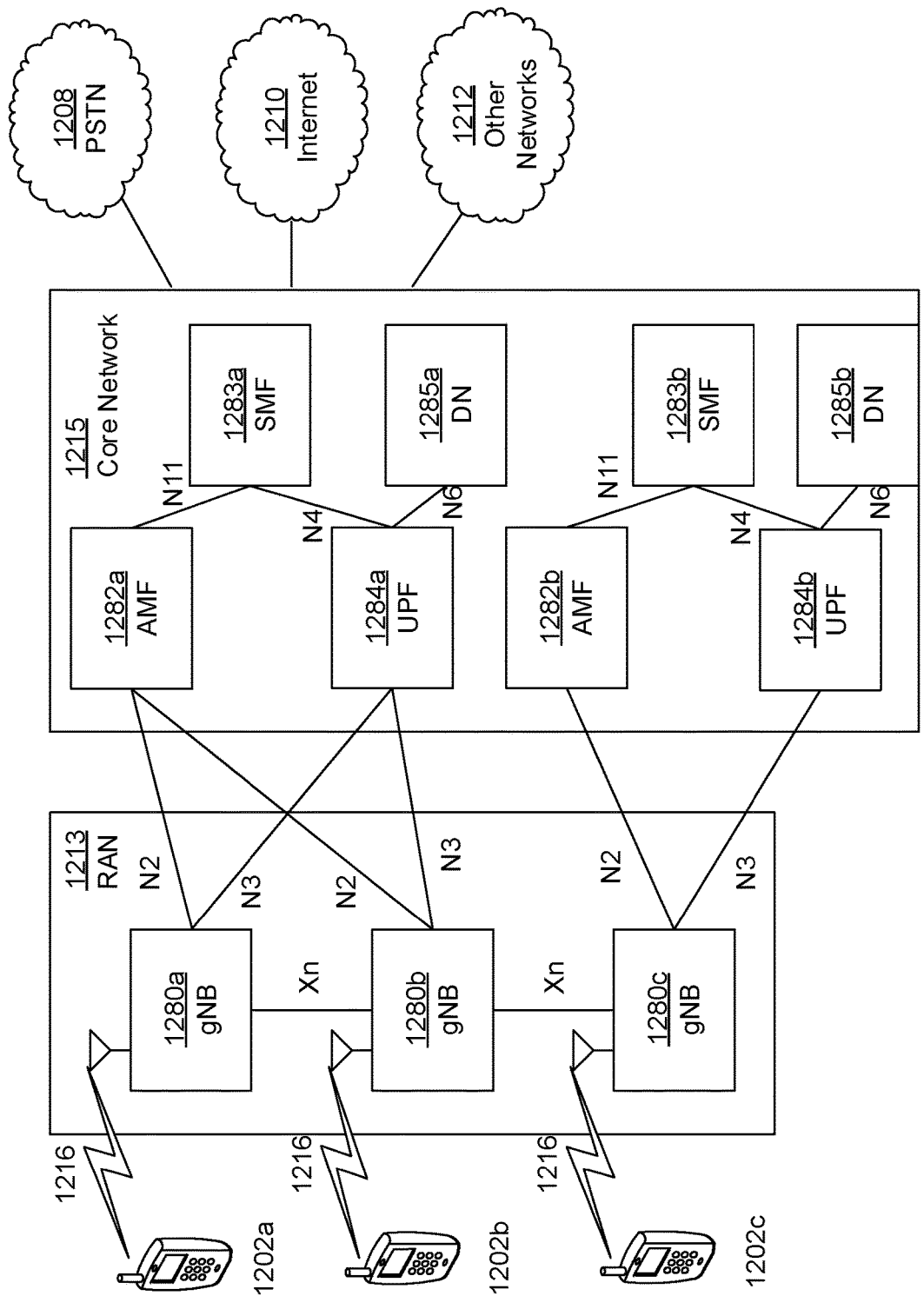
FIG. 12D is a system diagram illustrating a further example RAN and a further example CN that may be used within the communications system illustrated in FIG. 12A according to an embodiment.

In the United States, the available frequency bands, which may be used by 802.11ah, are from 902 MHz to 928 MHz. In Korea, the available frequency bands are from 917.5 MHz to 923.5 MHz. In Japan, the available frequency bands are from 916.5 MHz to 927.5 MHz. The total bandwidth available for 802.11ah is 6 MHz to 26 MHz depending on the country code FIG. 12D is a system diagram illustrating the RAN 1213 and the CN 1215 according to an embodiment. As noted above, the RAN 1213 may employ an NR radio technology to communicate with the WTRUs 1202a, 1202b, 1202c over the air interface 1216. The RAN 1213 may also be in communication with the CN 1215.

The RAN 1213 may include gNBs 1280a, 1280b, 1280c, though it will be appreciated that the RAN 1213 may include any number of gNBs while remaining consistent with an embodiment. The gNBs 1280a, 1280b, 1280c may each include one or more transceivers for communicating with the WTRUs 1202a, 1202b, 1202c over the air interface 1216. In one embodiment, the gNBs 1280a, 1280b, 1280c may implement MIMO technology. For example, gNBs 1280a, 1280b may utilize beamforming to transmit signals to and/or receive signals from the gNBs 1280a, 1280b, 1280c. Thus, the gNB 1280a, for example, may use multiple antennas to transmit wireless signals to, and/or receive wireless signals from, the WTRU 1202a. In an embodiment, the gNBs 1280a, 1280b, 1280c may implement carrier aggregation technology. For example, the gNB 1280a may transmit multiple component carriers to the WTRU 1202a (not shown). A subset of these component carriers may be on unlicensed spectrum while the remaining component carriers may be on licensed spectrum. In an embodiment, the gNBs 1280a, 1280b, 1280c may implement Coordinated Multi-Point (CoMP) technology. For example, WTRU 1202a may receive coordinated transmissions from gNB 1280a and gNB 1280b (and/or gNB 1280c).

The WTRUs 1202a, 1202b, 1202c may communicate with gNBs 1280a, 1280b, 1280c using transmissions associated with a scalable numerology. For example, the OFDM symbol spacing and/or OFDM subcarrier spacing may vary for different transmissions, different cells, and/or different portions of the wireless transmission spectrum. The WTRUs 1202a, 1202b, 1202c may communicate with gNBs 1280a, 1280b, 1280c using subframe or transmission time intervals (TTIs) of various or scalable lengths (e.g. containing varying number of OFDM symbols and/or lasting varying lengths of absolute time).

The gNBs 1280a, 1280b, 1280c may be configured to communicate with the WTRUs 1202a, 1202b, 1202c in a standalone configuration and/or a non-standalone configuration. In the standalone configuration, WTRUs 1202a, 1202b, 1202c may communicate with gNBs 1280a, 1280b, 1280c without also accessing other RANs (e.g. such as eNode-Bs 1260a, 1260b, 1260c). In the standalone configuration, WTRUs 1202a, 1202b, 1202c may utilize one or more of gNBs 1280a, 1280b, 1280c as a mobility anchor point. In the standalone configuration, WTRUs 1202a, 1202b, 1202c may communicate with gNBs 1280a, 1280b, 1280c using signals in an unlicensed band. In a non-standalone configuration WTRUs 1202a, 1202b, 1202c may communicate with/connect to gNBs 1280a, 1280b, 1280c while also communicating with/connecting to another RAN such as eNode-Bs 1260a, 1260b, 1260c. For example, WTRUs 1202a, 1202b, 1202c may implement DC principles to communicate with one or more gNBs 1280a, 1280b, 1280c and one or more eNode-Bs 1260a, 1260b, 1260c substantially simultaneously. In the non-standalone configuration, eNode-Bs 1260a, 1260b, 1260c may serve as a mobility anchor for WTRUs 1202a, 1202b, 1202c and gNBs 1280*a*, 1280*b*, 1280*c* may provide additional coverage and/or throughput for servicing WTRUs 1202*a*, 1202*b*, 1202*c*.

Each of the gNBs 1280*a*, 1280*b*, 1280*c* may be associated with a particular cell (not shown) and may be configured to handle radio resource management decisions, handover decisions, scheduling of users in the UL and/or DL, support of network slicing, dual connectivity, interworking between NR and E-UTRA, routing of user plane data towards User Plane Function (UPF) 1284*a*, 1284*b*, routing of control plane information towards Access and Mobility Management Function (AMF) 1282*a*, 1282*b* and the like. As shown in FIG. 12D, the gNBs 1280*a*, 1280*b*, 1280*c* may communicate with one another over an Xn interface.

The CN 1215 shown in FIG. 12D may include at least one AMF 1282*a*, 1282*b*, at least one UPF 1284*a*, 1284*b*, at least one Session Management Function (SMF) 1283*a*, 1283*b*, and possibly a Data Network (DN) 1285*a*, 1285*b*. While each of the foregoing elements are depicted as part of the CN 1215, it will be appreciated that any of these elements may be owned and/or operated by an entity other than the CN operator.

The AMF 1282*a*, 1282*b* may be connected to one or more of the gNBs 1280*a*, 1280*b*, 1280*c* in the RAN 1213 via an N2 interface and may serve as a control node. For example, the AMF 1282*a*, 1282*b* may be responsible for authenticating users of the WTRUs 1202*a*, 1202*b*, 1202*c*, support for network slicing (e.g. handling of different PDU sessions with different requirements), selecting a particular SMF 1283*a*, 1283*b*, management of the registration area, termination of NAS signaling, mobility management, and the like. Network slicing may be used by the AMF 1282*a*, 1282*b* in order to customize CN support for WTRUs 1202*a*, 1202*b*, 1202*c* based on the types of services being utilized WTRUs 1202*a*, 1202*b*, 1202*c*. For example, different network slices may be established for different use cases such as services relying on ultra-reliable low latency (URLLC) access, services relying on enhanced massive mobile broadband (eMBB) access, services for machine type communication (MTC) access, and/or the like. The AMF 1282 may provide a control plane function for switching between the RAN 1213 and other RANs (not shown) that employ other radio technologies, such as LTE, LTE-A, LTE-A Pro, and/or non-3GPP access technologies such as WiFi.

The SMF 1283*a*, 1283*b* may be connected to an AMF 1282*a*, 1282*b* in the CN 1215 via an N11 interface. The SMF 1283*a*, 1283*b* may also be connected to a UPF 1284*a*, 1284*b* in the CN 1215 via an N4 interface. The SMF 1283*a*, 1283*b* may select and control the UPF 1284*a*, 1284*b* and configure the routing of traffic through the UPF 1284*a*, 1284*b*. The SMF 1283*a*, 1283*b* may perform other functions, such as managing and allocating UE IP address, managing PDU sessions, controlling policy enforcement and QoS, providing downlink data notifications, and the like. A PDU session type may be IP-based, non-IP based, Ethernet-based, and the like.

The UPF 1284*a*, 1284*b* may be connected to one or more of the gNBs 1280*a*, 1280*b*, 1280*c* in the RAN 1213 via an N3 interface, which may provide the WTRUs 1202*a*, 1202*b*, 1202*c* with access to packet-switched networks, such as the Internet 1210, to facilitate communications between the WTRUs 1202*a*, 1202*b*, 1202*c* and IP-enabled devices. The UPF 1284, 1284*b* may perform other functions, such as routing and forwarding packets, enforcing user plane policies, supporting multi-homed PDU sessions, handling user plane QoS, buffering downlink packets, providing mobility anchoring, and the like.

The CN 1215 may facilitate communications with other networks. For example, the CN 1215 may include, or may communicate with, an IP gateway (e.g. an IP multimedia subsystem (IMS) server) that serves as an interface between the CN 1215 and the PSTN 1208. In addition, the CN 1215 may provide the WTRUs 1202*a*, 1202*b*, 1202*c* with access to the other networks 1212, which may include other wired and/or wireless networks that are owned and/or operated by other service providers. In one embodiment, the WTRUs 1202*a*, 1202*b*, 1202*c* may be connected to a local Data Network (DN) 1285*a*, 1285*b* through the UPF 1284*a*, 1284*b* via the N3 interface to the UPF 1284*a*, 1284*b* and an N6 interface between the UPF 1284*a*, 1284*b* and the DN 1285*a*, 1285*b*.

In view of FIGS. 12A-12D, and the corresponding description of FIGS. 12A-12D, one or more, or all, of the functions described herein with regard to one or more of: WTRU 1202*a-d*, Base Station 1214*a-b*, eNode-B 1260*a-c*, MME 1262, SGW 1264, PGW 1266, gNB 1280*a-c*, AMF 1282*a-b*, UPF 1284*a-b*, SMF 1283*a-b*, DN 1285*a-b*, and/or any other device(s) described herein, may be performed by one or more emulation devices (not shown). The emulation devices may be one or more devices configured to emulate one or more, or all, of the functions described herein. For example, the emulation devices may be used to test other devices and/or to simulate network and/or WTRU functions.

The emulation devices may be designed to implement one or more tests of other devices in a lab environment and/or in an operator network environment. For example, the one or more emulation devices may perform the one or more, or all, functions while being fully or partially implemented and/or deployed as part of a wired and/or wireless communication network in order to test other devices within the communication network. The one or more emulation devices may perform the one or more, or all, functions while being temporarily implemented/deployed as part of a wired and/or wireless communication network. The emulation device may be directly coupled to another device for purposes of testing and/or may performing testing using over-the-air wireless communications.

The one or more emulation devices may perform the one or more, including all, functions while not being implemented/deployed as part of a wired and/or wireless communication network. For example, the emulation devices may be utilized in a testing scenario in a testing laboratory and/or a non-deployed (e.g. testing) wired and/or wireless communication network in order to implement testing of one or more components. The one or more emulation devices may be test equipment. Direct RF coupling and/or wireless communications via RF circuitry (e.g. which may include one or more antennas) may be used by the emulation devices to transmit and/or receive data.

Although features and elements are described above in particular combinations, one of ordinary skill in the art will appreciate that each feature or element can be used alone or in any combination with the other features and elements. In addition, the methods described herein may be implemented in a computer program, software, or firmware incorporated in a computer-readable medium for execution by a computer or processor. Examples of computer-readable media include electronic signals (transmitted over wired or wireless connections) and computer-readable storage media. Examples of computer-readable storage media include, but are not limited to, a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WTRU, UE, terminal, base station, RNC, or any host computer.

What is claimed is:

1. A video decoding device, comprising:
a processor configured to:
obtain a video bitstream associated with a picture, wherein the picture is partitioned into multiple sub-pictures and wherein the video bitstream indicates whether respective sub-picture identifiers (IDs) of the multiple sub-pictures are signaled in the video bitstream, the video bitstream further indicating whether at least one sub-picture of the multiple sub-pictures is treated as a picture and whether wrap-around motion compensation is enabled for the at least one sub-picture;
determine the respective sub-picture IDs of the multiple sub-pictures from the video bitstream in response to determining, based on the video bitstream, that the respective sub-picture IDs are signaled in the video bitstream; and
in response to determining, based on the video bitstream, that the at least one sub-picture is treated as a picture and that wrap-around motion compensation is enabled for the at least one sub-picture:
determine a wrap-around offset applicable to the at least one sub-picture;
decode the picture associated with the bitstream based at least on the respective sub-picture IDs of the multiple sub-pictures and the determined wrap-around offset.

2. The video decoding device of claim 1, wherein, in response to determining that the respective sub-picture IDs are not signaled in the video bitstream, the processor is configured to determine the respective sub-picture IDs of the multiple sub-pictures based on a sequence of index values that range from 0 to a total number of sub-pictures included in the picture minus 1.

3. The video decoding device of claim 1, wherein whether the at least one sub-picture is treated as a picture and whether wrap-around motion compensation is enabled for the at least one sub-picture are indicated in a sequence parameter set of the video bitstream.

4. The video decoding device of claim 1, wherein whether the at least one sub-picture is treated as a picture and whether wrap-around motion compensation is enabled for the at least one sub-picture are indicated in a picture parameter set of the video bitstream.

5. The video decoding device of claim 1, wherein each of the multiple sub-pictures includes one or more slices that collectively cover a region of the picture associated with the video bitstream.

6. The video decoding device of claim 1, wherein the picture associated with the video bitstream is partitioned into a grid comprising the multiple sub-pictures, and wherein each of the sub-picture IDs indicates a position of the corresponding sub-picture in the grid.

7. The video decoding device of claim 1, wherein whether wrap-around motion compensation is enabled for the at least one sub-picture applies to whether horizontal wrap-around motion compensation is enabled for the at least one sub-pictures.

8. The video decoding device of claim 1, wherein the processor being configured to decode the picture associated with the video bitstream comprises the processor being configured to perform wrap-around motion compensation for the at least one sub-picture based on the determined wrap-around offset.

9. The video decoding device of claim 8, wherein the wrap-around offset is used to interpolate a luma sample associated with the at least one sub-picture.

10. A method of video decoding, the method comprising:
obtaining a video bitstream associated with a picture, wherein the picture is partitioned into multiple sub-pictures and wherein the video bitstream indicates whether respective sub-picture identifiers (IDs) of the multiple sub-pictures are signaled in the video bitstream, the video bitstream further indicating whether at least one sub-picture of the multiple sub-pictures is treated as a picture and whether wrap-around motion compensation is enabled for the at least one sub-picture;
determining the respective sub-picture IDs of the multiple sub-pictures from the video bitstream in response to determining, based on the video bitstream, that the respective sub-picture IDs are signaled in the video bitstream; and
in response to determining, based on the video bitstream, that the at least one sub-picture is treated as a picture and that wrap-around motion compensation is enabled for the at least one sub-picture:
determine a wrap-around offset applicable to the at least one sub-picture;
decoding the picture associated with the bitstream based at least on the sub-picture IDs of the multiple sub-pictures and the determined wrap-around offset.

11. The method of claim 10, further comprising, in response to determining that the respective sub-picture IDs are not signaled in the video bitstream, determining the respective sub-picture IDs of the multiple sub-pictures based on a sequence of index values that range from 0 to a total number of sub-pictures included in the picture minus 1.

12. The method of claim 10, wherein whether the at least one sub-picture is treated as a picture and whether wrap-around motion compensation is enabled for the at least one sub-picture are indicated in a sequence parameter set of the video bitstream.

13. The method of claim 10, wherein whether the at least one sub-picture is treated as a picture and whether wrap-around motion compensation is enabled for the at least one sub-picture are indicated in a picture parameter set of the video bitstream.

14. The method of claim 10, wherein each of the multiple sub-pictures includes one or more slices that collectively cover a region of the picture associated with the video bitstream.

15. The method of claim 10, wherein the picture associated with the video bitstream is partitioned into a grid comprising the multiple sub-pictures, and wherein each of the sub-picture IDs indicates a position of the corresponding sub-picture in the grid.

16. The method of claim 10, wherein whether wrap-around motion compensation is enabled for the at least one sub-picture applies to whether horizontal wrap-around motion compensation is enabled for the at least one sub-pictures.

17. The method of claim 16, wherein decoding the picture associated with the video bitstream comprises performing the wrap-around motion compensation for the at least one sub-picture based on the determined wrap-around offset.

18. The method of claim 17, wherein the wrap-around offset is used to interpolate a luma sample associated with the at least one sub-picture.

19. A video encoding device, comprising:
a processor configured to:
- partition a picture into multiple sub-pictures;
- based on a determination to include respective sub-picture identifiers (IDs) of the multiple sub-pictures in a video bitstream:
  - determine the respective sub-picture IDs of the multiple sub-pictures;
  - include the determined sub-picture IDs of the multiple sub-pictures in the video bitstream; and
  - add a first indication to the video bitstream indicating that the respective sub-picture IDs of the multiple sub-pictures are signaled in the video bitstream; and
- based on a determination to treat at least one sub-picture of the multiple sub-pictures as a picture and to enable wrap-around motion compensation for the at least one sub-picture:
  - add a second indication to the video bitstream indicating that the at least one sub-picture is treated as a picture; and
  - add a third indication to the video bitstream indicating that wrap-around motion compensation is enabled for the at least one sub-picture.

20. The video encoding device of claim 19, wherein the first indication, the second indication and the third indication are added to a sequence parameter set of the video bitstream.

* * * * *